United States Patent [19]
Kurita et al.

[11] Patent Number: 5,359,727
[45] Date of Patent: Oct. 25, 1994

[54] CLOCK GENERATOR USING PLL AND INFORMATION PROCESSING SYSTEM USING THE CLOCK GENERATOR

[75] Inventors: Kozaburo Kurita, Hitachi; Tetsuo Nakano, Ome, both of Japan

[73] Assignee: Hitachi, Ltd., Tokyo, Japan

[21] Appl. No.: 487,125

[22] Filed: Mar. 2, 1990

Related U.S. Application Data

[63] Continuation-in-part of Ser. No. 184,782, Apr. 22, 1988, Pat. No. 5,133,064.

[30] Foreign Application Priority Data

Mar. 3, 1989 [JP] Japan .................. 1-051387

[51] Int. Cl.$^5$ .............................................. G06F 1/06
[52] U.S. Cl. ........................................ 395/550; 331/10
[58] Field of Search ................. 395/550; 364/200; 328/140, 155; 307/113 R, 113 A, 262, 264, 482, 578; 331/10, 11

[56] References Cited

U.S. PATENT DOCUMENTS

| | | | |
|---|---|---|---|
| 4,063,308 | 12/1977 | Collins et al. | 395/550 |
| 4,184,126 | 1/1980 | Jaskolski et al. | 331/113 R |
| 4,494,021 | 1/1985 | Bell et al. | 307/578 |
| 4,494,080 | 1/1985 | Call | 331/8 |
| 4,500,799 | 2/1985 | Sud et al. | 307/578 |
| 4,593,254 | 6/1986 | Coburn | 331/17 |
| 4,598,251 | 7/1986 | Wehrs | 328/140 |
| 4,633,106 | 12/1986 | Backes et al. | 307/578 |
| 4,633,193 | 12/1986 | Scordo | 328/155 |
| 4,749,961 | 6/1988 | Kato et al. | 331/113 R |
| 4,777,577 | 10/1988 | Bingham et al. | 363/60 |
| 4,812,784 | 3/1989 | Chung et al. | 331/113 R |
| 4,893,271 | 1/1990 | Davis et al. | 395/550 |
| 5,006,979 | 4/1991 | Yoshie et al. | 364/200 |
| 5,077,686 | 12/1991 | Rubinstein | 395/550 |

OTHER PUBLICATIONS

ISSCC '89 Digest of Technical papers 124–125 (1989).
JP-A-55-80137 (corres. to U.S. Pat. No. 4,419,739).
IEEE Journal of Solid–State Circuits SC-22 No. 2 (1987) pp. 255 to 261.
JP-A-58-184626.
JP-A-60-128709.
JP-A—61-16614
JP-A-63-268020 (corres. to part of above U.S. Patent Appln. No. 184,782).
JP-A-64-25626 (corres. to part of above U.S. Patent Appln. No. 184,782).

*Primary Examiner*—Dale M. Shaw
*Assistant Examiner*—Sang Hui Kim
*Attorney, Agent, or Firm*—Antonelli, Terry, Stout & Kraus

[57] ABSTRACT

In a clock generating apparatus or clock generator employing PLL (phase-locked loop) by controlling a VCO (voltage controlled oscillator) in response to an output obtained by phase-comparing a clock signal based on an output signal of the VCO with an externally applied timing signal, a range of an oscillating frequency of VCO is varied in accordance with a frequency variation in the timing signal. A clock generating apparatus is provided for each of plural information processing sections, so as to surely synchronize operations of data processings including data transfers between the respective sections. When a clock signal is distributed to each of the information processing sections, the clock signal outputted from the distributing circuit is phase-compared in order to control the VCO. A charge pump circuit for a low-pass filter is employed and a frequency/current converting circuit for controlling VCO is also employed, which are suitable in order for generating a clock signal in a range of, for instance, 1 to 100 MHz in response to the frequency variation in the timing signal.

14 Claims, 14 Drawing Sheets

F I G. 5
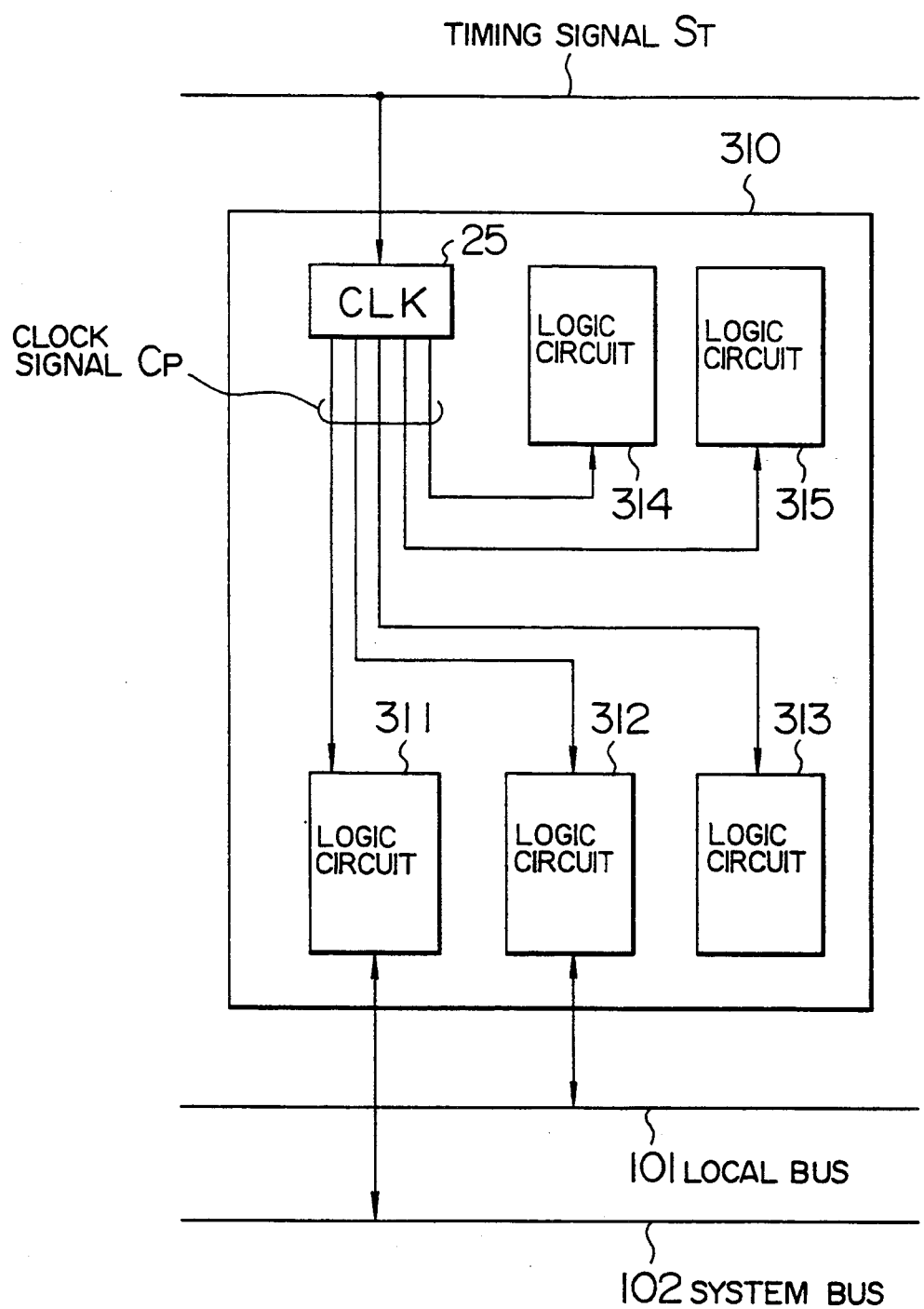

F I G. 12
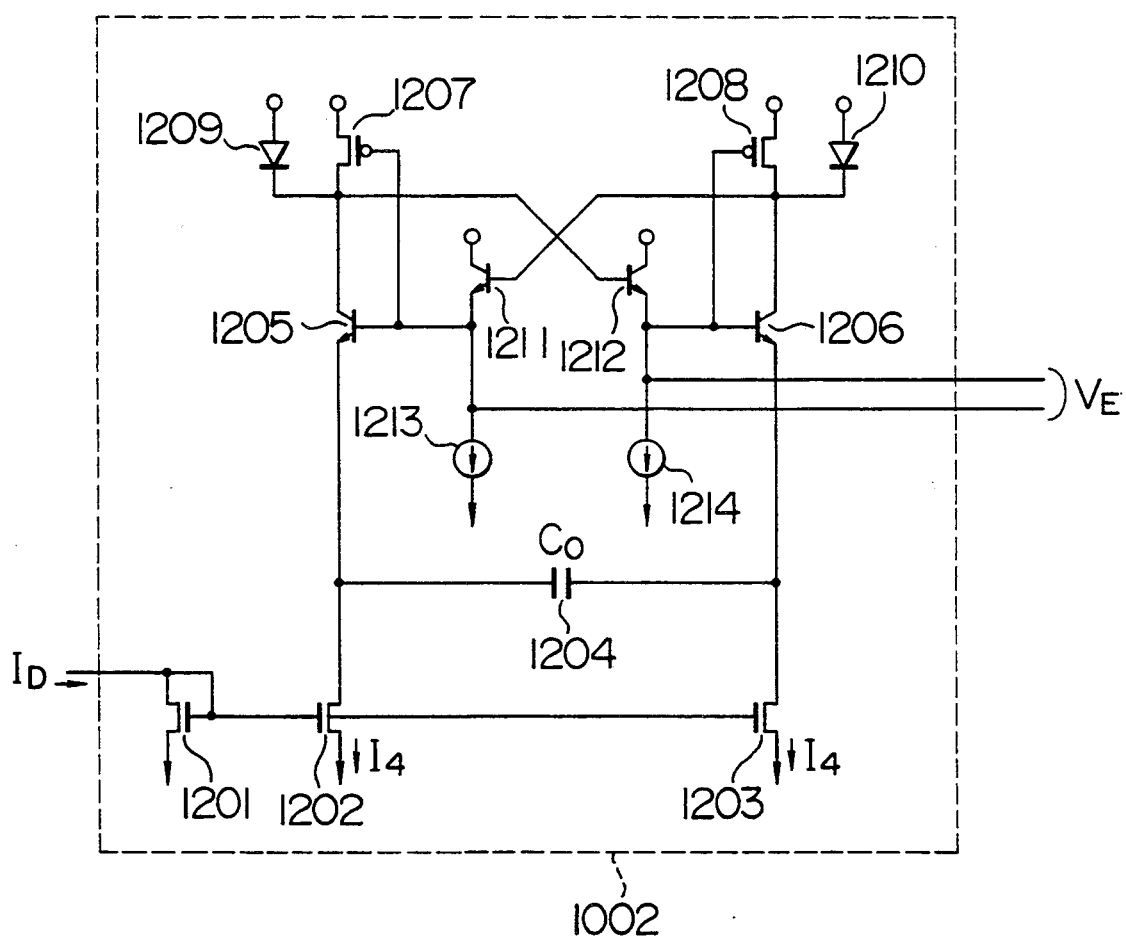

F I G. 13
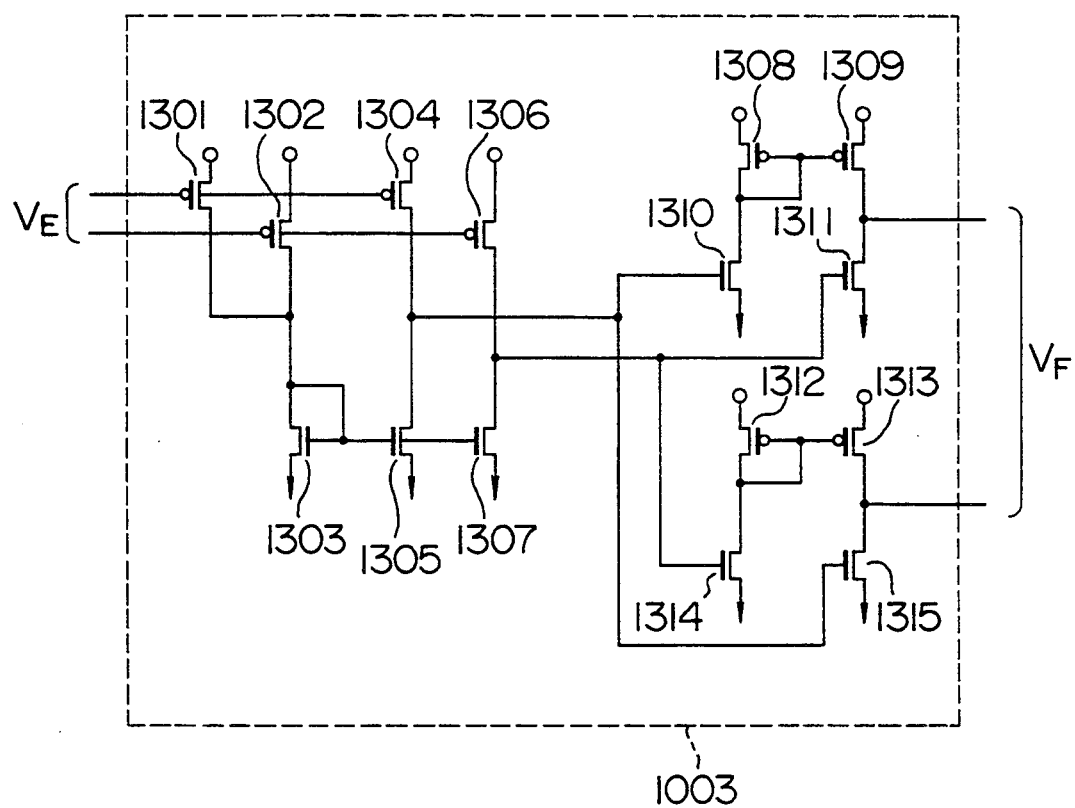

F I G. 17
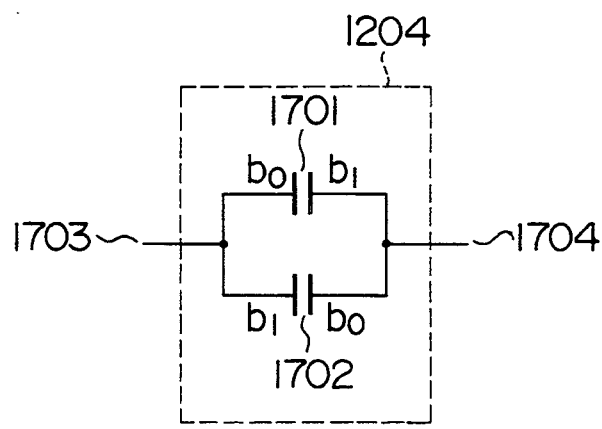
F I G. 18A
F I G. 18B
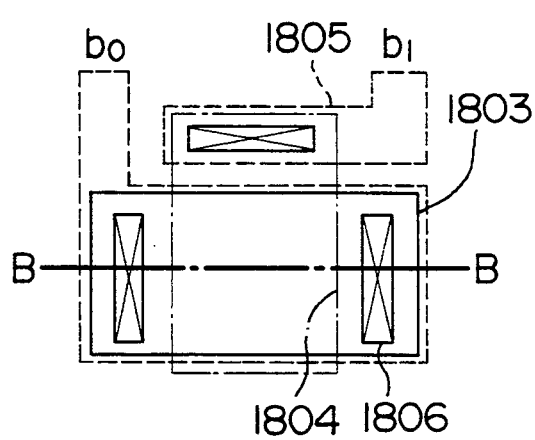
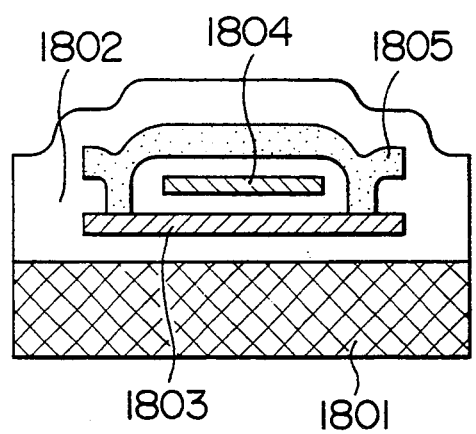
F I G. 19
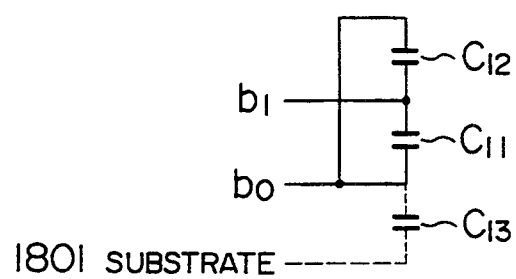

CLOCK GENERATOR USING PLL AND INFORMATION PROCESSING SYSTEM USING THE CLOCK GENERATOR

CROSS REFERENCE TO RELATED APPLICATION

This application is a continuation-in-part of copending U.S. application Ser. No. 184,782, filed Apr. 22, 1988, now U.S. Pat. No. 5,133,064, issued Jul. 21, 1992.

BACKGROUND OF THE INVENTION

The present invention relates generally to a clock generator, and more specifically, to a clock generation circuit for a semiconductor integrated circuit device including an information processing system in which logic operations are carried out based upon the clock.

In information processing systems where logic operations are performed in response to clocks, it is important to supervise clock timings so as to prevent erroneous operations in an internal logic operation and to realize a high-speed logic operation. In particular, in case that there are employed a plurality of information processing sections it is preferable to synchronize the clocks for the respective information processing sections in order that data transfers are surely performed at a high speed between the plural information processing sections. Such a conventional information processing system has been discussed, for instance, in ISSCC '89 Digest of Technical papers 124–125 (1989) or U.S. patent application Ser. No. 184,782 field on Apr. 22, 1988 and entitled "Information processor and information processing system utilizing clock signal" (assigned to the same assignee with the present invention and still pending). As a clock generating circuit for satisfying such a demand, it was proposed in JP-A-55-80137 (corresponding to U.S. Pat. No. 4,419,739) which discloses a circuit for generating a clock synchronized with an external signal. IEEE JOURNAL OF SOLID-STATE CIRCUITS SC-22 No. 2 (1987) pages 255 to 261, and JP-A-58-184626 show examples of clock generating circuit employing a phase-locked loop (simply referred to as a "PLL").

FIG. 2 is a schematic block diagram of a clock generating circuit employing such a PLL, as disclosed in U.S. Pat. No. 5,133,064, issued on Jul. 21, 1992. A clock generating circuit 10 is formed of a phase detector 11, a low-pass filter (LPF) 12, a voltage controlled oscillator (VCO) 13, and a frequency divider 14. The phase detector 11 continuously compares the phase difference between a timing signal related to an external signal and a synchronization clock signal. The output produced by the phase difference is smoothed by LPF 12 and supplied as a control signal for VCO 13. VCO 13 increases/decreases an oscillating frequency in response to the supplied output from LPF 12, an oscillating output is frequency-divided by a frequency divider 14 and then is outputted as a synchronization clock signal. These circuits constitute a feedback system. When the phase of the timing signal leads from the phase of the synchronization clock signal, the phase detector 11 detects the phase difference therebetween and causes the oscillating frequency of VCO 13 to increase via LPF 12. When the oscillating frequency of VCO 13 is increased, the frequency of the synchronization clock signal is also increased so that the phase of the synchronization clock signal leads and the phase difference between the synchronization clock signal and the timing signal is decreased. Conversely, in situations where the phase of the timing signal is delayed from the phase of the synchronization clock signal, the phase of the synchronization clock signal is delayed, so that the phase difference between the timing signal and synchronization clock signal is made smaller. In other words, PLL 10 operates to synchronize the phase of the synchronization clock signal with that of the timing signal and also to make both frequencies coincident, which functions as an automatic frequency control.

Various circuits 11 to 14 have been hitherto proposed as circuit elements forming PLL 10, which are selectively utilized taking account of a desired overall performance. For example, Japanese Patent Application No. 58-237228 (JP-A-60-128709). In general, as to VCO 13, a capacitor (e.g., a stray capacitance) is employed therein, a charging/discharging current thereof is controlled in response to an input voltage, whereby a time constant is varied so as to determine the oscillating frequency. However, there is such a limitation that the charging/discharging current of the capacitor may be varied within a predetermined range. As a result, a variable range of the oscillating frequency is necessarily restricted to a predetermined range.

The following is a detailed description of why such a limitation is given.

Since PLL 10 is so operated as to make the phase of the timing signal coincident with that of the synchronization clock signal, there is a case where the phase of the timing signal is coincident with that of the synchronization clock signal even when the frequency of the synchronization clock signal is equal to a frequency produced by multiplying the frequency of the timing signal by an integral number or an inverse number. In this case, since there is no phase difference between these signals, PLL 10 is brought into a balanced condition, and thus a quasi phase-locked state may occur. To avoid this difficulty, the oscillating frequency of VCO 13 employed in PLL 10 must be limited to a predetermined range over which no quasi phase-locked state occurs. If the oscillating frequency range of VCO 13 is wide, the variations in the oscillating frequency with respect to those in the input voltage become large so that the loop gain of PLL 10 becomes large. Since the noise bandwidth of PLL 10 becomes high when the loop gain of PLL 10 becomes large, the operation of PLL 10 becomes unstable. Under such circumstances, in general, the variable range of the oscillating frequency of VCO 13 is set to a predetermined range.

Now, an explanation is made of the above-mentioned problems in the art. In PLL 10 represented in FIG. 2, both the phase and frequency of the timing signal are coincident with those of the synchronization clock signal by way of the feedback system formed of the respective circuit elements 11 to 14. However, as above mentioned, the frequency of the synchronization clock signal depends upon the oscillating frequency of VCO 13, and therefore cannot be varied within a range corresponding to the oscillating frequency range of VCO 13. As a consequence, in the case where the frequency of the timing frequency exceeds over the frequency range of the synchronized clock signal corresponding to the oscillating frequency range of VCO 13, PLL 10 is no longer operated. There is a problem that the synchronization of the clock signals between the information processing sections cannot be maintained.

By the way, it is often required to maintain the synchronization of such a clock signal even with the application of an input timing signal frequency exceeding over the frequency range of a synchronized clock signal. In an information processing system such as computer or minicomputer, each of the information processing sections employed in the system is operated at a high speed. Recently, in an information processing section such as a processor or a controller fabricated by a semiconductor integrated circuit utilizing CMOS techniques, the semiconductor integrated circuit can be operated at the clock frequency of 30 MHz. Moreover, a report has been made that such a circuit is operable at the frequency higher than 70 MHz by utilizing Bi CMOS techniques. Then, these semiconductor integrated circuits are not only operated at the maximum frequency, but also operated even at a frequency lower than this maximum frequency. In other words, when tests are performed to manufacturing steps of such semiconductor integrated circuits, a diagnostic circuit additionally provided for the testing purpose must operate at a frequency, for instance, which is several MHz lower than the usual operation frequency of the normal logic circuits. Namely it is desired that clock generating circuits included in respective information processing systems are preferably operable under the input or timing clock frequencies from several MHz to several tens MHz.

In case that the input clock frequency range of the clock generating circuit is narrow, there is a possibility of incapability of the desired operation of the clock generating circuit when the operating frequency must be varied due to the testing operation. As a consequence, it is required to additionally employ an exclusive clock generating circuit in response to such a variable frequency range of the input timing frequency. Otherwise, means for externally adjusting the operating range of the clock generating circuit must be provided, and the adjustments must be made for every circuit in correspondence with the desired frequencies.

SUMMARY OF THE INVENTION

A principal object of the present invention is to provide a clock generator having a wide frequency range (e.g., in the order of 1 to 100 MHz) and capable of generating a synchronization clock signal in response to an externally inputted timing signal whose frequency may be varied in a wide range.

Another object of the present invention is to provide a clock generating apparatus wherein a PLL is employed and a clock signal synchronized with an input timing signal is generated, and further there is provided compensation means for varying an oscillating frequency range of voltage controlled oscillating means in the PLL in response to a frequency variation of the input timing signal.

Another object of the present invention is to provide an information processing system employing a plurality of information processing sections and clock generating means for these sections which are synchronized with one another.

Another object of the present invention is to provide a clock generating apparatus wherein a plurality of clock signals synchronized with an input timing signal are produced and distributed by employing PLL, one clock signal distributed from the distributing circuit is inputted to the phase detector employed in the PLL so as to phase-compare the clock signal with the input timing signal. Another object of the present invention is to provide an information processing system comprising a plurality of information processing sections provided with the clock generating apparatuses to establish a synchronization between the sections.

A further object of the present invention is to provide a charge pump circuit suitable for a low-pass filter of a PLL type clock generating apparatus including compensation means for varying an oscillating frequency range of voltage controlled oscillating means employed in the PLL in response to a frequency variation in an input timing signal; and to provide a frequency/current converting means suitable as the compensation means.

In accordance with the principal aspect of the present invention, a clock generating apparatus is provided which includes phase comparing means; voltage controlled oscillating means for generating an oscillation output signal having a frequency in response to an output signal of the phase comparing means; means for generating a clock signal based upon the oscillation output from the voltage controlled oscillating means, an input timing signal and the generated clock signal being inputted to the phase comparing means so as to generate a clock signal synchronized with the input timing signal; and compensation means for receiving the input timing signal and varying a range of an oscillating frequency of the voltage controlled oscillating means in response to a frequency variation of the input timing signal.

When the frequency of the timing signal is high, the compensation means varies the range of the oscillating frequency of the voltage controlled oscillating means to a higher frequency range. As a result, since the frequency range of the synchronization clock signal in the clock generating apparatus is similarly changed into a higher frequency range, it can be prevented that the frequency of the timing signal is out of the frequency range of the synchronization clock signal. Conversely, when the frequency of the timing signal is lowered the compensation means operates so as to change the frequency range of the synchronization clock signal into a lower frequency range. That is to say, since the frequency range of the synchronization clock signal is varied in accordance with the frequency change of the timing signal, it can obviate the conventional inconvenience that the clock generating apparatus gets in failure due to the incapability of following the frequency changes in the timing signal. According to the present invention, the clock generating apparatus having the wide frequency range of the input clock can be realized. As a result, clock generating circuits exclusively used for the frequency of various input clocks are no longer required, and also conventional adjustments for clock generating circuits are no longer required.

With the above-mentioned arrangements of the present invention, even when the frequency of the timing signal is greatly varied, the synchronization clock signal based upon the output of the voltage controlled oscillating means can be reliably synchronized with the timing signal. The operations relating to the data processing including data transfer operations between a plurality of information processing apparatuses can be reliably synchronized with each other.

As one practical example of applying the present invention, various types of semiconductor device testing apparatuses operable at different frequencies can be realized. Other practical examples of applying the present invention are information processing systems such as office computers, work stations which operate at high frequencies with logic LSIs requiring synchronization of internal clock signals, and portable type personal computers with a power-saving capability of lowering their operating frequency to decrease their power loss in the case where there is no accessing of the system elements. Namely, the frequency decreasing operation is included for the saving of necessary electric power as one of the cases of changing operating frequencies of such LSI-incorporated systems. Chip operating electric power is approximately proportional to operating frequency in CMOS or BiCMOS LSIs.

BRIEF DESCRIPTION OF THE DRAWINGS

FIG. 5 is a schematic block diagram of a semiconductor integrated circuit device employing the embodiment shown in FIG. 4;

FIGS. 11 through 13 are detailed circuit diagrams for explaining various parts of the voltage controlled oscillator shown in FIG. 10;

FIG. 17 is a schematic arrangement of a capacitor for determining an oscillating frequency according to the present invention;

FIGS. 18A and 18B illustrate structures of the capacitor shown in FIG. 17 on a semiconductor chip; and FIG. 19 is an equivalent circuit of the capacitor shown in FIG. 18.

DESCRIPTION OF THE PREFERRED EMBODIMENTS

Figure 1:
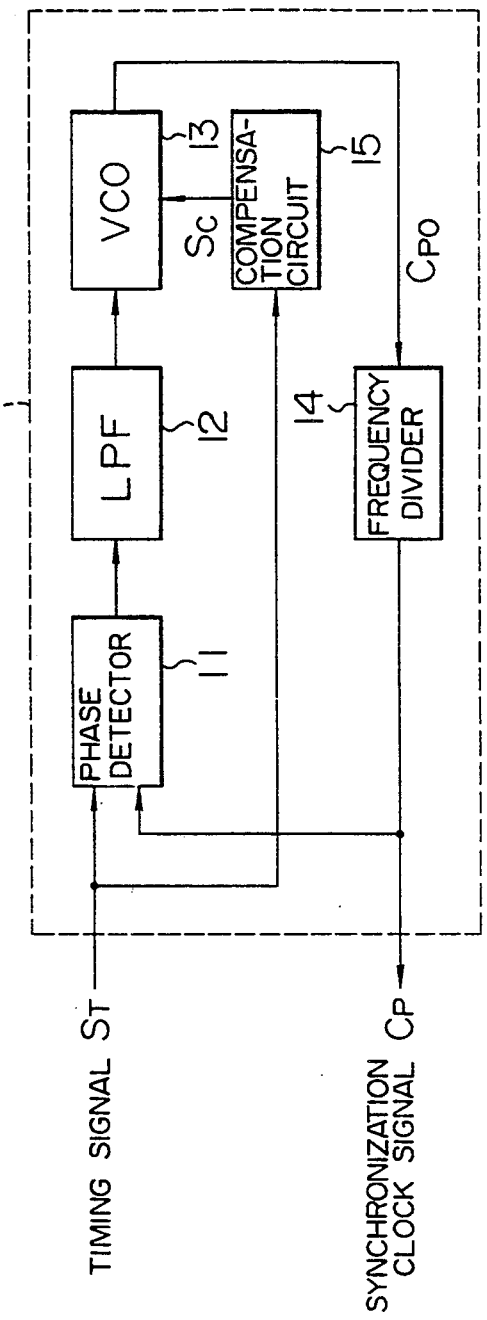
FIG. 1 is a schematic block diagram of a clock generating circuit according to one embodiment of the present invention.

FIG. 1 shows a schematic block diagram of a first embodiment according to the present invention.

Figure 2:
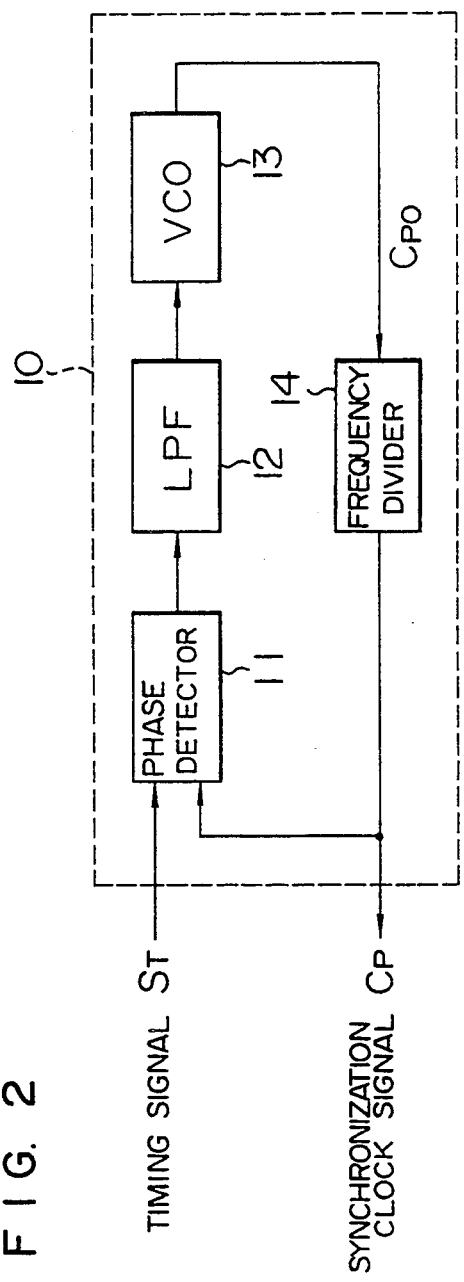
FIG. 2 is a schematic block diagram of a clock generating circuit of U.S. Pat. No. 5,133,064.
Figure 10:
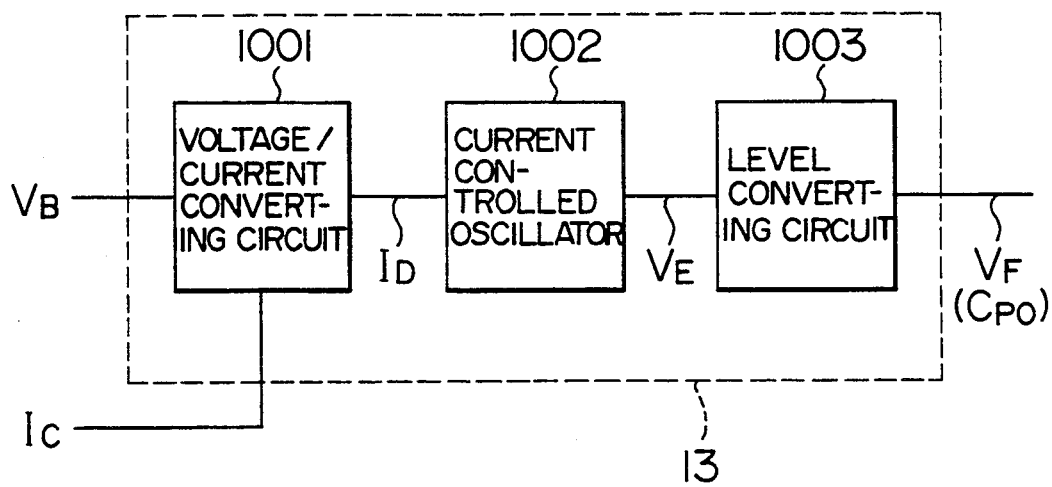
FIG. 10 is a schematic block diagram of an overall arrangement of a voltage controlled oscillator.
Figure 11:
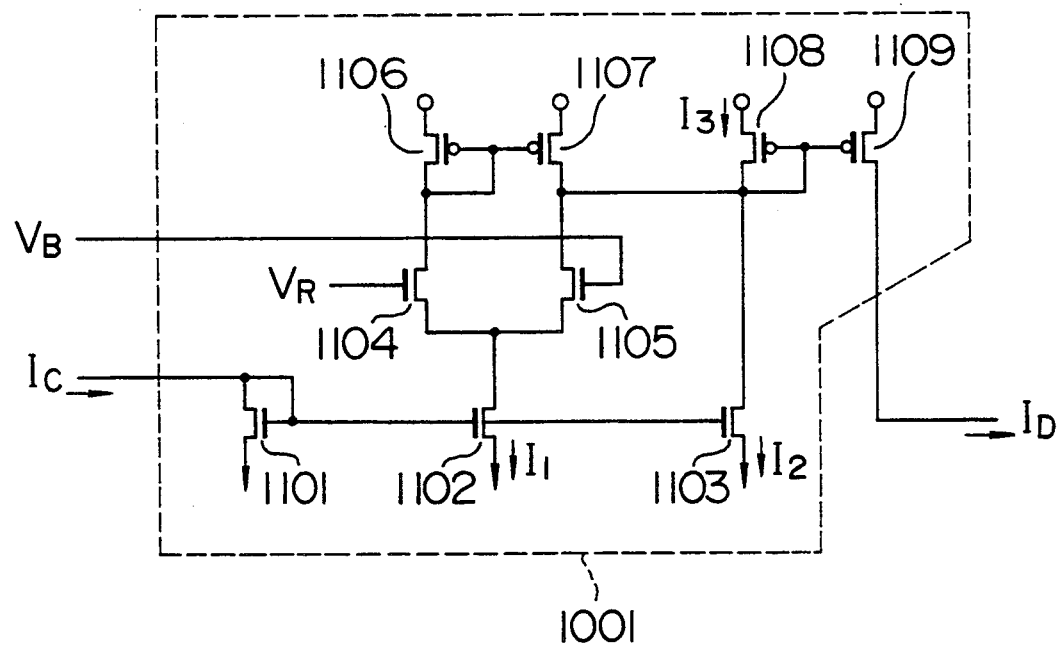
Figure 15:
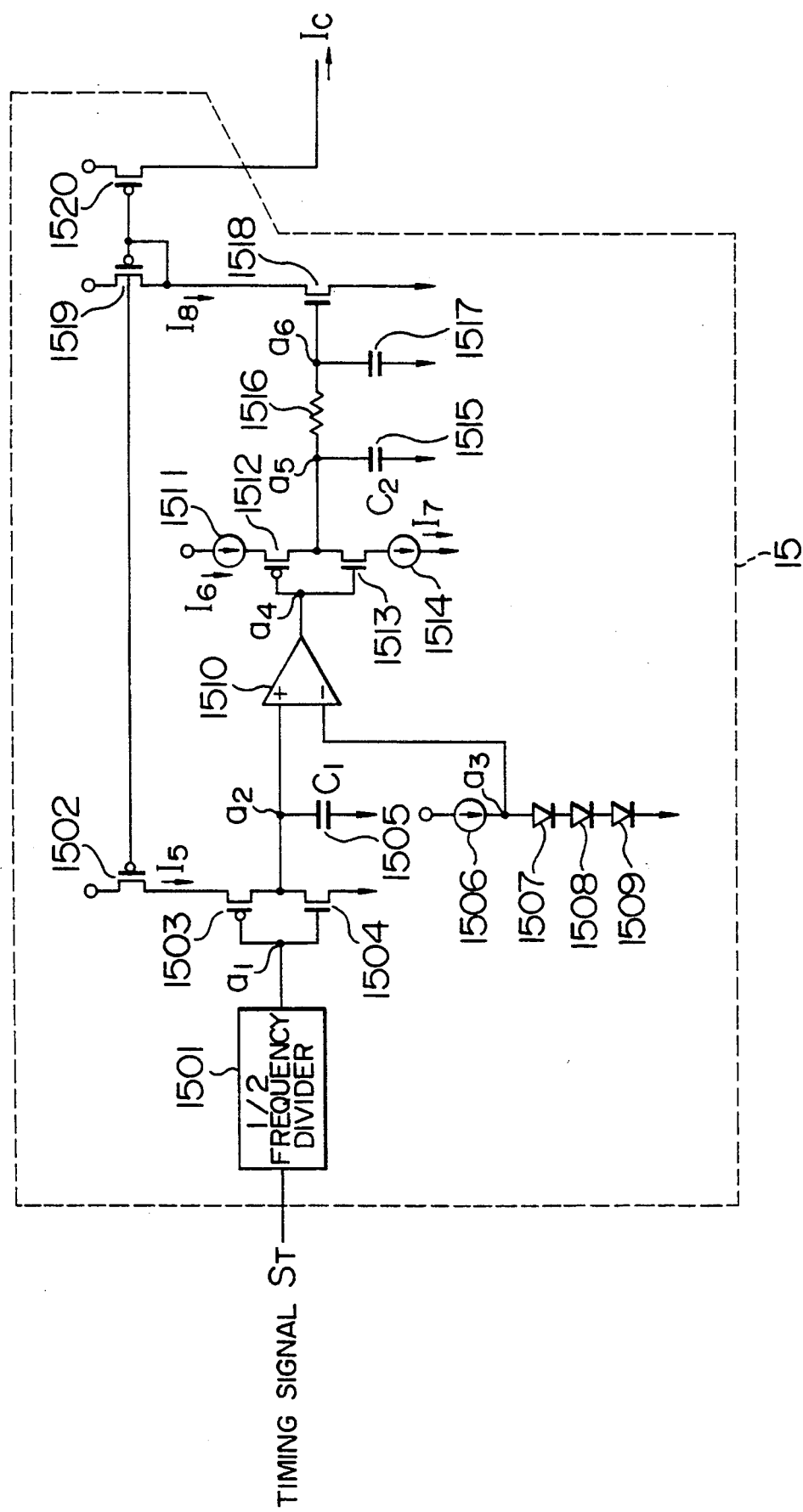
FIG. 15 is a circuit arrangement of a compensation circuit according to the present invention.

As shown in the drawing, the present embodiment corresponds to a clock generating circuit 20, and the same reference numerals as those of the prior art shown in FIG. 2 correspond to components having the same functions and configurations thereof. In FIG. 2, the following aspect differs from the prior art. A compensation circuit 15 is provided for receiving a timing signal "$S_T$" as an input and for varying an oscillating frequency range of VCO13 in response to a timing frequency "$f_T$" of the signal $S_T$. The compensation circuit 15 outputs a signal "$S_C$" for enabling the oscillating frequency range of VCO13 to be changed into a higher frequency range when the frequency $f_T$ is increased. Conversely, when the frequency $f_T$ is lowered, the compensation circuit 15 outputs another signal $S_C$ to VCO13, whereby the oscillating frequency range is shifted to a lower frequency range. A synchronization clock signal $C_P$ corresponds to a signal which is obtained by frequency-dividing an oscillating output signal $C_{PO}$ of VCO13 in a frequency divider 14. As a result, the frequency range of the synchronization clock signal $C_P$ has a proportional relationship with the oscillating frequency range of VCO13. As previously explained, according to the embodiment, since the range of the frequency "$f_C$" of the synchronization clock signal is varied in response to the frequency $f_T$ of the timing signal $S_T$, the frequency $f_T$ is within the frequency range of the synchronization clock signal $C_P$. As a result, the synchronization clock signal $C_P$ which is synchronized with the timing signal $S_T$ and the frequency of which is coincident with that of the timing signal can be obtained. As a consequence, the present embodiment can realize a clock generating circuit having such a wide frequency range as being capable of following the variations in the frequency of the timing signal $S_T$. It is noted that specific embodiments of VCO13 and compensation circuit 15 will be discussed later (FIGS. 10, 11 and 15).

Figure 3:
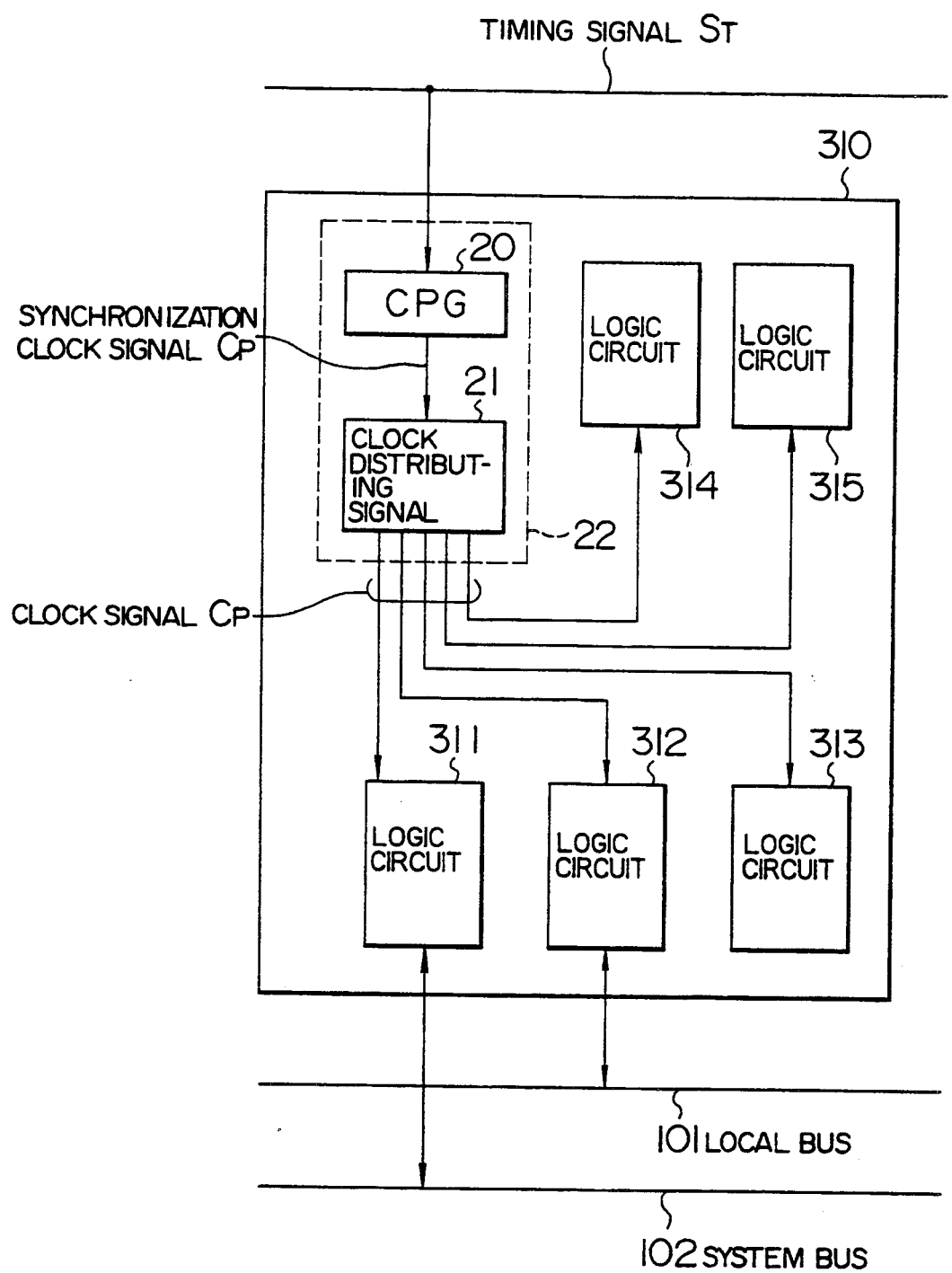
FIG. 3 is a schematic block diagram of a semiconductor integrated circuit device employing the embodiment shown in FIG. 1.

FIG. 3 shows an arrangement of an information processing LSI chip in which the clock generating circuit 20 shown in FIG. 1 is incorporated. The LSI chip 310 is formed of a clock circuit 20 comprising a clock generating circuit (CPG)20 and a clock distributing circuit 21, and of logic circuit blocks 311 to 315 under the control of the clock signal $C_P$ outputted from the clock circuit 22. In response to the timing signal $S_T$ inputted from the outside of the chip, CPG20 outputs the synchronization clock signal $C_P$ synchronized with the timing signal and produces at the distributing circuit 21 a clock signal for controlling the respective blocks 311 to 315. It should be noted that the clock signal $C_P$ corresponds to a signal which is delayed from the timing signal $S_T$ by a delay time caused in the distributing circuit 21. However, the LSI chip 310 is operated substantially in synchronization with the timing signal. As a result, when the LSI chip 310 transmits and receives data via a local bus 10 and a system bus 102, there is a particular advantage that the LSI chip 310 can be operated in the synchronization mode based upon the timing signal used commonly with other systems.

Figure 4:
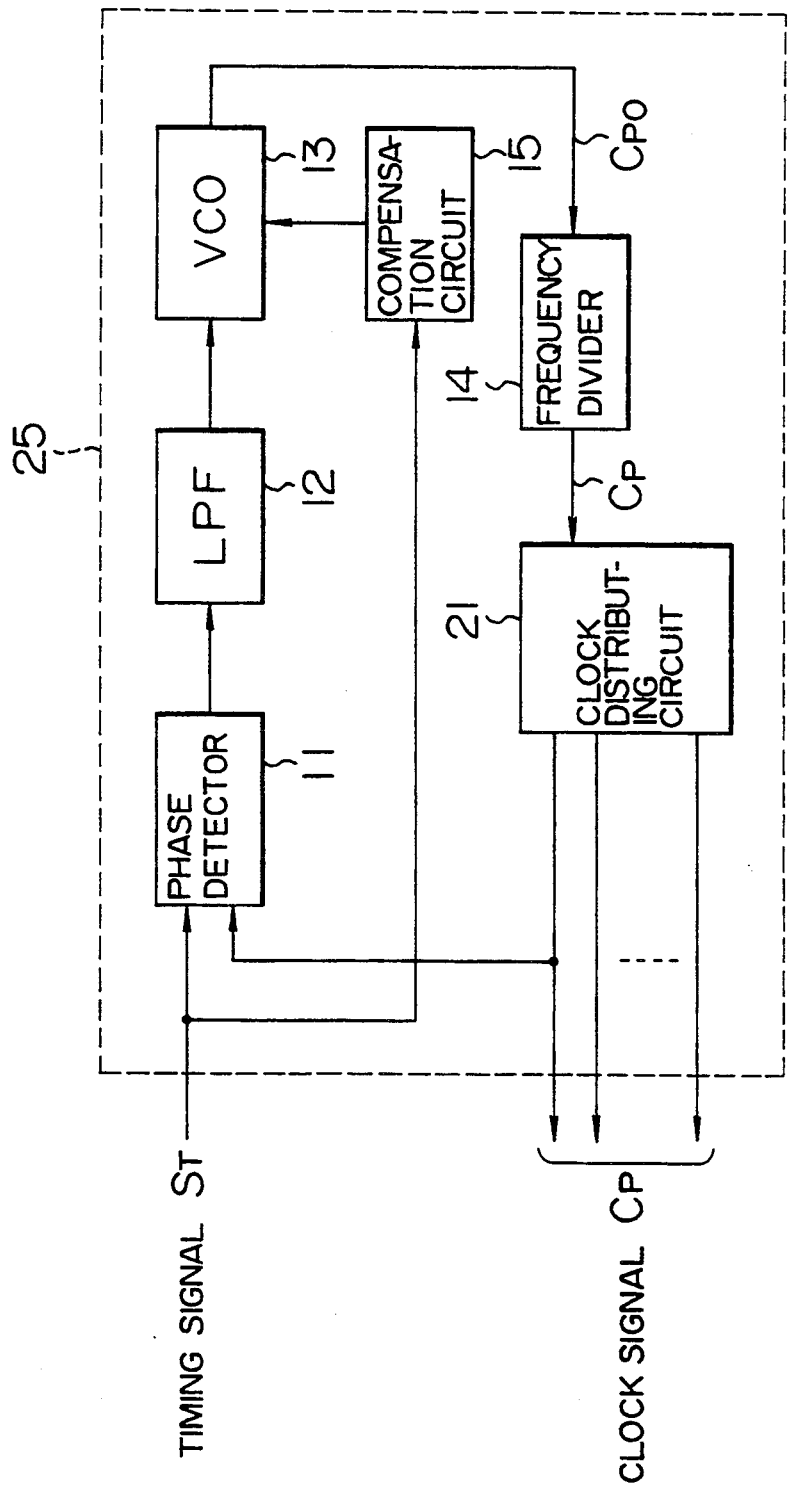
FIG. 4 is a schematic block diagram of a clock generating circuit according to another embodiment of the present invention.

In FIG. 4, an arrangement of a second embodiment according to the present invention is shown. As shown in the drawing, in a block diagram of a block circuit 25 containing a clock generating circuit employing PLL, the same reference numerals employed in FIGS. 1 and 2 indicate the same functions and arrangements. In FIG. 4, a different point from the above-described embodiment shown in FIG. 1 is such an arrangement that one of the clock signals $C_P$ is fed back to the phase detector 11 via the clock distributing circuit 21 for distributing the outputs of the frequency divider 14. Thus, in accordance with this embodiment, the delays caused by the clock distributing circuit 21 can be also compensated, and the clock signals of the logic blocks 311 to 315 as described with reference to FIG. 3 can be synchronized with the external timing signal $S_T$. It should be noted that the above-described delays by the distributing circuit 21 are caused by employing a multiplicity of buffers for the distribution purpose. The typical delay is, for instance, 2 to 3 n sec.

FIG. 5 shows an arrangement of an information processing chip according to another embodiment of this invention, in which the clock circuit 25 shown in FIG. 4 is incorporated. The same reference numerals shown in FIG. 3 indicate the same components. In this embodiment, since both the timing signal $S_T$ and clock signal $C_P$ are synchronized with each other by a clock circuit CLK 25, the LSI chip 310 is operated in synchronization with the timing signal, and is operable in a complete synchronization mode while transmitting and receiving data via local bus 101 and system bus 102 to other LSI chips.

Figure 6:
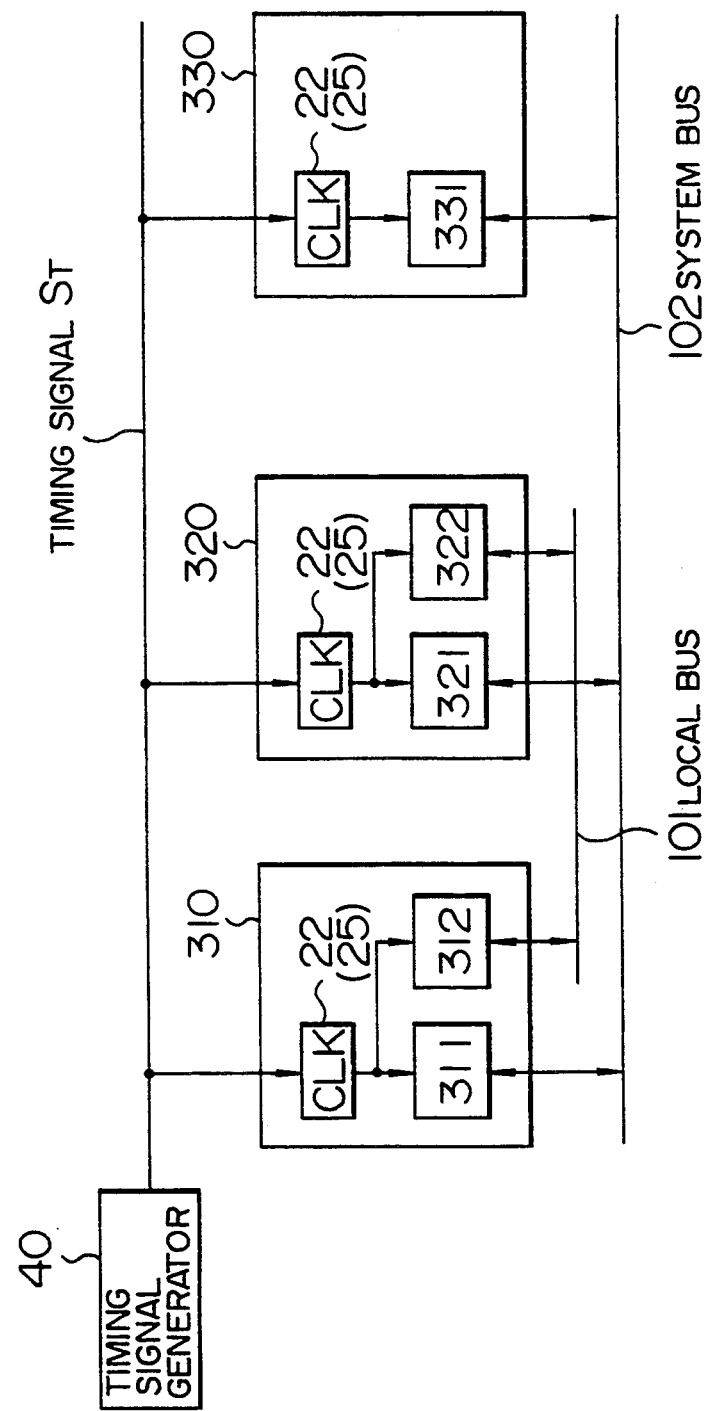
FIG. 6 is a schematic block diagram of an information processing system employing a clock generating circuit according to the present invention.

FIG. 6 shows an information processing system according to still another embodiment employing the information processing LSI shown in FIG. 3 or 5. In FIG. 6, reference numeral 310 indicates CPU (central processing unit) for processing information in accordance with a program; reference numeral 320 denotes MMU (memory management unit) for managing data processed in the system and storing a portion of the data as a cache memory; reference numeral 330 represents FPU (floating processing unit) in which a numeral calculation required for a software processing operation is performed at a high speed by employing an exclusive hardware. The respective units 310 to 330 are connected via a system bus 102 to each other and to other peripheral portions. An inherent local bus 101 is provided to connect the unit 310 to the unit 320 so that the unit 310 can access the cache memory employed in the unit 320 at a high speed. The respective units 310 to 330 include clock circuit 22 or 25 which are controlled by a common timing signal "$S_T$" outputted from a timing signal generating circuit 40. As a result, all of clock signals to control logic blocks employed in the units 310 to 330 are in synchronism with each other, the synchronization of the data transfer effected between the LSIs via the data buses 101 and 102 can be established, and thus the data transfer can be surely performed. Also, since the data transfer is surely performed, the high speed operation can be realized and the high-speed information processing system can be accordingly obtained.

Referring now to FIGS. 7 to 16, concrete embodiments of the respective block units for constituting the embodiments shown in FIGS. 1 and 4 will be described.

Figure 7:
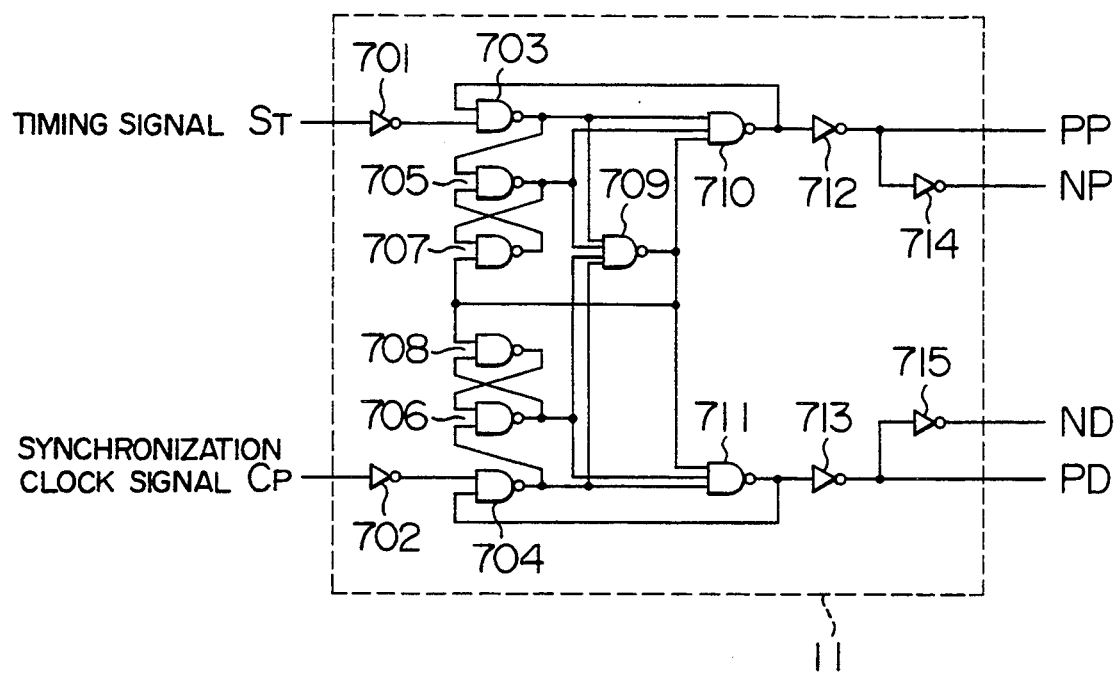
FIG. 7 is a circuit arrangement of a phase detector.
Figure 8:
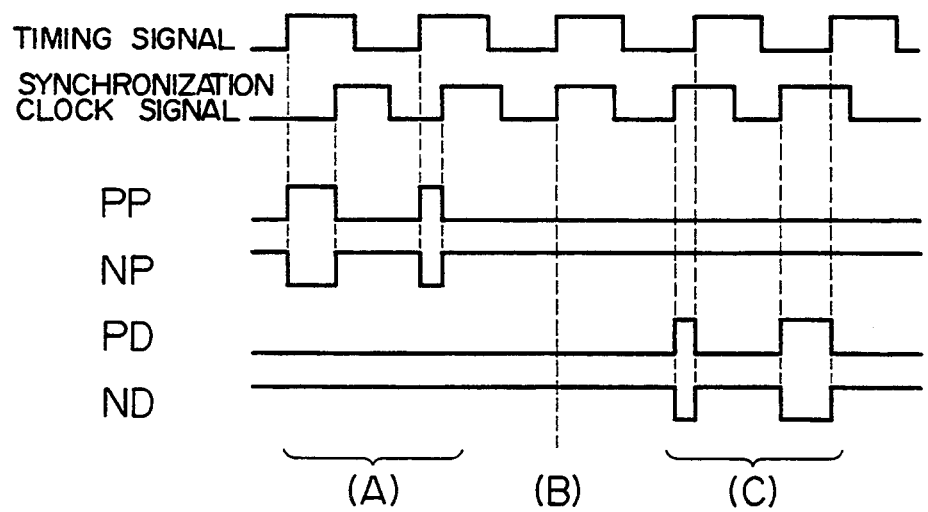
FIG. 8 is a timing chart for explaining an operation of the phase detector.

In FIG. 7, there is shown a phase detector 11. As shown in the figure, the phase detector 11 is formed of inverters 701, 702, 712 to 715; 2-input NANDs 703 to 708; 3-input NANDs 710, 711; and 4-input NAND 709. The phase detector with this arrangement is a frequency/phase comparing type phase comparator for converting a phase difference between leading edges of the timing signal $S_T$ and synchronization clock signal $C_P$ into output pulse signals PP, NP, PD and ND having waveforms shown in a timing chart of FIG. 8 with respective pulse widths. Level-inverted pulses are outputted by the inverters 714 and 715. When the phase of the timing signal $S_T$ leads to that of the synchronization clock signal $C_P$, as shown in FIG. 8(A), pulse signals PP and NP having pulse widths corresponding to the phase differences are outputted.

Conversely, when the phase of the timing signal $S_T$ is delayed from that of the synchronization clock signal $C_P$, as shown in FIG. 8(C), signals PD and ND are outputted. When the leading edge of the timing signal $S_T$ is coincident with that of the synchronization clock signal $C_P$, the synchronization condition is established and no change is made in the outputs as shown in FIG. 8(B). In other words, the phase difference between the timing signal $S_T$ and synchronization clock signal $C_P$ is converted into the pulse width of opposite polarities (defining logic high and low levels).

Figure 9:
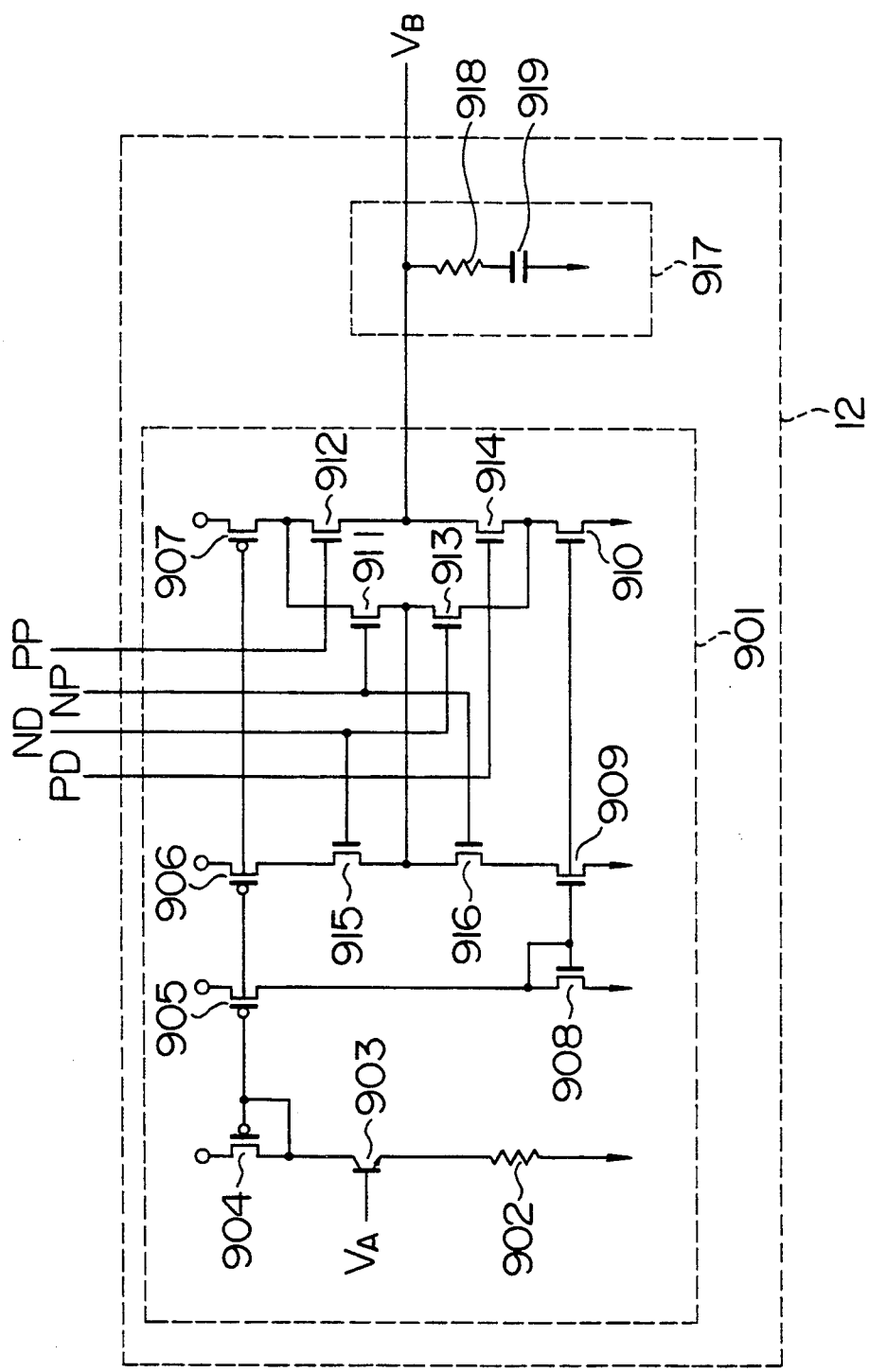
FIG. 9 is a circuit diagram of a low-pass filter according to the present invention.

FIG. 9 shows a low-pass filter (LPF) 12 according to the present invention. As shown in this figure, a charge pump circuit 901 and a loop filter 917 are employed so as to form the low-pass filter.

In the charge pump circuit 901, reference numerals 904 to 907 indicate PMOS, reference numerals 908 to 916 indicate NMOS, reference numeral 902 is a resistor, and reference numeral 903 indicates an NPN transistor. The charge pump circuit 901 is designed so that each current flowing through PMOS 906, 907 and NMOS 909, 910 is equal to each other. That is to say, PMOSs 904 and 906, 904 and 907, PMOSs 904 and 905, NMOS 908 and 909, and 908 and 910 constitute current mirrors, and then their currents are controlled by the current flowing through the resistor 902 by the bias voltage "$V_A$" of the transistor 903. NMOSs 912, 911 and NMOSs 914, 913 are controlled by the opposite polarity output pulse signals PP, NP and PD, ND of the phase detector 11. These NMOSs 912, 911 and NMOSs 914, 913 are switches for switching the currents flowing through PMOS 907 and NMOS 910 between into an injection current to the output $V_B$ and into an internal sink or absorption current. Thus, when NMOS 912 is turned on, the signal PP is "H" and the signal NP is "L", the current of PMOS 907 is supplied to the output $V_B$. On the other hand, when NMOS 914 is turned on, that is to say, the signal PD is "H" and the signal ND is "L", the current of NMOS 910 is drawn from $V_B$. As a consequence, the output pulse of the phase detector 11 is converted into the pulse current flowing through the output $V_B$.

On the one hand, NMOS 916 is controlled in response to the signal NP and turned on when NMOS 912 is turned off, when as shown in FIG. 8, the signal PP is "L" and the signal NP is "H". Thus the current of PMOS 907 is conducted to NMOS 909 via the NMOS 916 and NMOS 911 which is also turned on. On the other hand, NMOS 915 is controlled by the signal ND and turned on when NMOS 914 is turned off. That is to say, in case that the signal PD is "L" and the signal ND is "H", NMOS 914 is turned on, and the current of PMOS 906 is conducted to NMOS 910 via NMOS 915 and NMOS 913 which is also turned on. As a result, since the currents of PMOS 907 and NMOS 910 continuously flow even when NMOSs 912 and 914 are turned off and no currents are outputted to the output $V_B$, the potentials of their drains can be maintained constant. As a result, noise currents which might be otherwise caused by charge shares of the switching operations by NMOSs 912 and 914 can be obviated. As previously described, since the charge pump circuit 901 can output the pulse current having the pulse width equal to that of the phase detector 11, the injection or drawing of the charges proportional to the pulse width can be realized.

The loop filter 917 is formed of a series circuit comprising a resistor 918 and a capacitor 919, and integrates a pulse current of the charge pump circuit 901 to be converted into a voltage.

Thus, in the low-pass filter 12, since the charge pump circuit 901 injects charges into the loop filter 917 with the output pulse signals PP and NP, the potential of $V_B$ is increased. Since the charge pump circuit 901 draws charges from the loop filter 917 with the output pulse signals PD and ND, the potential of $V_B$ is decreased. As a consequence, the pulse signal corresponding to the phase difference is converted into the voltage.

In FIG. 10, there is shown a voltage controlled oscillator (VCO) 13 according to still another embodiment. As shown in FIG. 10, the voltage controlled oscillator 13 is formed of a voltage/current converting circuit 1001, a current controlled oscillator 1002 and a level converting circuit 1003. The voltage/current converting circuit 1001 converts the output voltage $V_B$ of the low-pass filter 12 into a current control signal $I_D$ and outputs this current control signal $I_D$ to the current controlled oscillator 1002 in response to a current control signal $I_C$ to a compensating circuit 15. As a result, the current controlled oscillator 1002 oscillates at a frequency corresponding to the current control signal $I_D$, and outputs a signal $V_E$ (ECL level) having a low voltage amplitude. The level converting circuit 1003 amplifies $V_E$ to a signal $V_F$ having a CMOS level and outputs the same.

FIG. 11 shows the voltage/current converting circuit 1001 shown in FIG. 10 according to yet another embodiment. In FIG. 11, NMOSs 1101, 1102 and 1103 constitute a current mirror. Currents $I_1$ and $I_2$ flowing through NMOSs 1102 and 1103 respectively have a proportional relationship with a current $I_C$, and are expressed by the following equations:

$$I_1 = n_1 \cdot I_C \quad (1)$$

$$I_2 = n_2 \cdot I_C \quad (2)$$

On the other hand, NMOSs 1104 and 1105 constitute a differential pair, and shunts the current $I_1$ in accordance with a potential relationship between a reference voltage $V_R$ and a voltage $V_B$. It should be noted that the current of NMOS 1104 flows through PMOS 1106. This PMOS 1106 and another PMOS 1107 constitute a current mirror, and when currents flowing therethrough are set to be equal to each other, the current of PMOS 1107 is equal to that of NMOS 1104. Assuming now that the potential of $V_B$ is higher than that of $V_R$, a current of NMOS 1105 becomes higher than that of NMOS 1104. However, since PMOS 1107 can supply only the same current as that of NMOS 1104, the difference thereof between the currents of NMOS 1105 and 1104 is supplied from the circuit of PMOS 1108 and NMOS 1103. As a consequence, a current $I_3$ flowing through PMOS 1108 is higher than another current $I_2$ flowing through NMOS 1103. Conversely, in case that the potential of $V_B$ is lower than that of $V_R$, the current flowing through NMOS 1105 is lower than that of NMOS 1104, but PMOS 1107 supplies the same current as that of NMOS 1104, so that an extra current other than a current flowing through NMOS 1105 is directed into the circuit of NMOS 1108 and NMOS 1103 and the current $I_3$ is lower than the current $I_2$. In other words, the current $I_3$ is varied with a center of $I_2$ in response to the amplitudes of the voltage $V_B$. In this case, a variation range of the current $I_3$ is determined by the following relation under the condition of the bias current $I_1$ of NMOSs 1104 and 1105.

$$I_2 + I_1 \geq I_3 \geq I_2 - I_1 \quad (3)$$

By the way, since PMOSs 1108 and 1109 constitute a current mirror, there is a proportional relationship between the output currents $I_D$ and $I_3$ of the voltage/current converting circuit 1001, which is expressed as follows:

$$I_D = n_3 \cdot I_3 \quad (4)$$

In accordance with the above-described relations (1), (2), (3) and (4), the following relations is satisfied.

$$n_3(n_2 + n_1)I_C \geq I_D \geq n_3(n_2 - n_1)I_C \quad (5)$$

As a consequence, the voltage/current converting circuit 1001 is operated in such a way that when the potential of the output voltage $V_B$ becomes high within the range where the relation (5) is satisfied, then the current $I_D$ becomes large, whereas the current $I_D$ becomes small when the potential of the output voltage $V_B$ becomes low. Also, the range where the current $I_D$ is changed depends upon the current $I_C$. When the current $I_C$ is set to be large, the center of the range of the current "$I_D$" is moved to a large value. Conversely, when the current $I_C$ is set to be small, the center thereof is moved to a small value.

FIG. 12 shows a current controlled oscillator 1002. As shown in this figure, the oscillator 1002 includes: NMOSs 1201 to 1203; a capacitor 1204; NPN transistors 1205, 1206, 1211, 1212; PMOSs 1207, 1208; diodes 1209, 1210, and current sources 1213, 1214. This oscillator 1002 corresponds to an emitter-coupled type multivibrator having such an arrangement that the input/output of switching circuit formed of bipolar transistors 1205, 1206, and PMOSs 1207, 1208 as load elements, are cross-coupled to each other via respective level shift circuits formed of transistor 1211 and current source 1213, and also of transistor 1212 and current source 1214. Currents flowing through these transistors 1205 and 1206 are controlled by NMOSs 1202 and 1203. The diodes 1209 and 1210 are clamp elements for limiting signal amplitudes and opposite polarity output signals VE outputted via the level shift circuits have the amplitude $V_{BE}$. NMOSs 1201, 1202 and 1203 constitute a current mirror. As a result, when currents flowing through NMOSs 1202 and 1203 are set to "$I_4$", this current $I_4$ has a proportional relationship with the output current $I_D$ of the voltage/current converting circuit 1001, and is expressed by the following equation:

$$I_4 = n_4 \cdot I_D \quad (6)$$

The oscillating frequency "$f_o$" of such an emitter coupled type multivibrator is expressed by the following equation if the capacitance of the timing capacitor 1204 is equal to $C_O$":

$$f_o = \frac{I_4}{4 \cdot V_{BE} \cdot C_0} \quad (7)$$

Based upon the above equations (6) and (7), the following relation can be obtained:

$$f_O = \frac{I_4}{4 \cdot V_{BE} \cdot C_O} I_D \quad (8)$$

That is to say, the current controlled oscillator 1002 outputs the oscillating frequency proportional to the current $I_D$.

It should be noted that since the current $I_D$ owns the current range defined by the relation (5), the oscillating frequency "$f_O$" has a frequency range and the following relations is satisfied based upon the relations (5) and (8):

$$\frac{n_4 \cdot n_3(n_2 + n_1)}{4 \cdot V_{BE} \cdot C_0} I_C \geq f_O \geq \frac{n_4 \cdot n_3(n_2 - n_1)}{4 \cdot V_{BE} \cdot C_0} I_C \quad (9)$$

As apparent from the foregoing explanation, when the current $I_C$ becomes large, a center of the frequency range of the oscillating frequency "$f_O$" is moved to a higher frequency. Conversely, when the current $I_C$ becomes small, this center is moved to a lower frequency.

In the embodiment shown in FIG. 12, a switching circuit is arranged by the switching elements of NPN transistors 1205 and 1206, and PMOS transistors 1207 and 1208 as load elements, and further the gates of the PMOS transistors 1207 and 1208 are connected to the base electrodes of the NPN transistors 1205 and 1206, respectively. As a consequence, since the base potential of the NPN transistor 1205 becomes high when the NPN transistor 1205 is turned on, the gate voltage of the PMOS transistor 1207 becomes low and its impedance becomes high. Conversely, when the NPN transistor 1205 is turned off, since the base potential thereof becomes low, the gate voltage of the PMOS transistor 1207 becomes high and its impedance becomes low. This is similarly applied to the relationship between the NPN transistor 1206 and PMOS transistor 1208. In other words, since the impedances of the load elements 1207 and 1208 become high when the switching elements 1205 and 1206 are turned on, respectively, the voltage drop becomes large even when the current is small, and also the respective voltage amplitude to be limited by the clamp elements 1209 and 1210 can be procured. On the other hand, since the impedances of the load elements 1207 and 1208 become low when the switching elements 1205 and 1206 are turned off, the collector voltages of the switching elements 1205 and 1206 can be quickly increased to the power source voltage. In current controlled oscillators where such load elements have a constant or fixed impedance value, the oscillating bandwidth becomes narrow. Because the oscillating frequency becomes low, that is to say, the current flowing through the switching element is small, the voltage drop at the load element becomes small in proportion to the current. When the voltage drop is lower than the limiting voltage of the clamp element for limiting the voltage across the terminals of the load element, the output amplitude as the oscillator cannot be maintained, so that no operation is made. Conversely, in situations where the oscillating frequency becomes high, there is no problem in the output amplitude. However, since the rising speed of the output is determined by a time constant defined by the impedance of the load element and a stray capacitance to be driven by this element, no operation is made at a higher frequency than the frequency determined by this time constant. As previously described, in the situation where the impedance of the load element is constant, the oscillating frequency range of the oscillator cannot be widened. To the contrary, in accordance with the foregoing embodiment, the oscillator having the wide oscillating frequency range can be realized by varying the impedance of the load element.

In FIG. 13, there is shown a level converting circuit 1003 according to a further embodiment. As shown in FIG. 13, this level converting circuit 1003 is constructed of PMOSs 1301, 1302, 1304, 1306, 1308, 1309, 1312 and 1313, and NMOSs 1303, 1305, 1307, 1310, 1311, 1314 and 1315. Since the gates of MOSs 1305 and 1307 functioning as bias current sources for ratio type inverter circuits arranged by MOSs 1304, 1305; and 1306, 1307 are controlled by outputs of a circuit constructed of MOSs 1301 to 1303 to which the output pulse signals $V_E$ of the current controlled oscillator 1002 are inputted, a logic threshold value of the ratio type inverter circuit can be set at a center of the high and low levels of the pulse signal $V_E$, so that the circuit arranged by MOSs 1301 to 1307 can surely amplify the amplitude of the pulse signal $V_E$. The circuit formed of MOSs 1308 through 1311 and MOSs 1312 to 1315 corresponds to a push-pull type inverter circuit arranged by a CMOS type current mirror, and further amplifies the amplified pulse signal to a signal having a CMOS level amplitude via the single-ended circuit. That is to say, the level converting circuit 1003 is a double-amplification circuit by which the low voltage pulse signals $V_E$ of the current controlled oscillator 1002 are level-changed to two level-increased output pulse signals "$V_F$" of a CMOS level and of opposite polarities at which the logic gate circuit can be operated.

Figure 14:
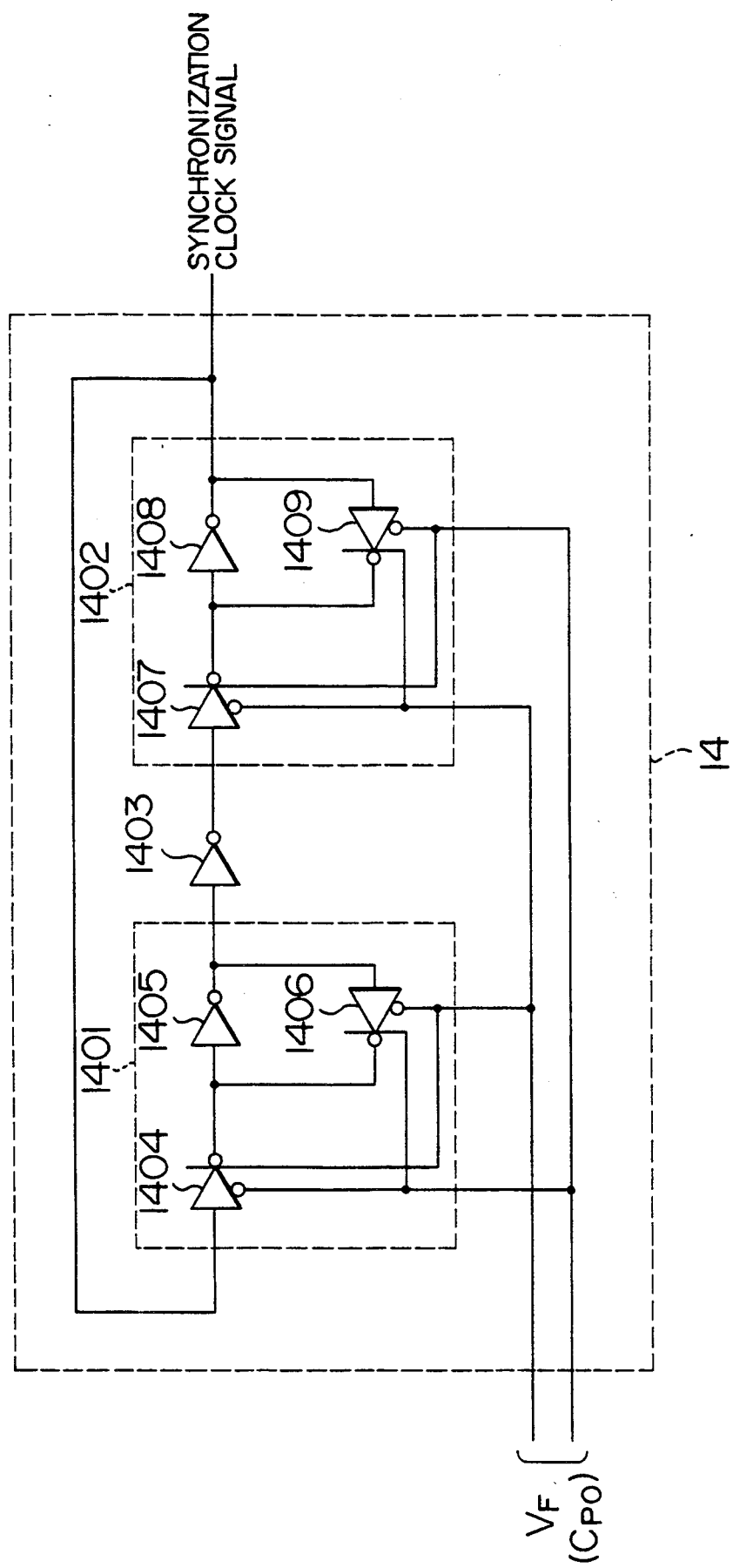
FIG. 14 is a circuit arrangement of a frequency divider.

FIG. 14 shows a frequency divider 14. The frequency divider 14 includes feedback type latch circuits 1401 and 1402 formed of clocked inverter gate circuits 1404, 1406, 1407 and 1409, and inverter gate circuits 1405 and 1408. These are controlled in an opposite logic level in response to the output pulse signals $V_F$ of the level converting circuit and negatively fed back via an inverter gate circuit 1403 so as to divide the frequency of the output pulse signals $V_F$ by 2 and to output the frequency-divided output signal as a synchronization clock signal $C_P$.

In FIG. 15, there is shown a compensation circuit 15 according to a still further embodiment. The frequency divider 1501 outputs an output signal "$a_1$" which is obtained by dividing the frequency "$f_T$" of the timing signal "$S_T$" by 2. This signal $a_1$ is supplied to the gates of PMOS 1503 and NMOS 1504 so as to control a charging/discharging operation of a capacitor 1505, which constitutes an integrator circuit. A potential $a_2$ of this capacitor 1505 is applied to a plus input terminal of a comparator 1510. To a minus input terminal of this comparator 1510, a potential "$a_3$" of 3 VBE is applied from a bias circuit arranged by a series circuit including a current source 1506 and diodes 1507 to 1509. Then, the comparator 1510 compares the input potentials $a_2$ with $a_3$ so as to thereby output an output signal $a_4$ having a CMOS level amplitude. This signal $a_4$ is inputted to gates of PMOS 1512 and NMOS 1513. These switching elements are series-connected to each other in order to constitute a charge pump circuit. An output signal $a_5$ of this charge pump circuit is supplied to a capacitor 1515 so that a charging/discharging operation of the capacitor 1515 is controlled. Also, the output signal $a_5$ is applied to a low-pass filter arranged by a resistor 1516 and a capacitor 1517 so as to smooth the potential of the capacitor 1515. An output voltage "$a_6$" of the low-pass filter circuit is applied to a gate of NMOS 1518. This NMOS 1518 is connected to PMOS 1519 of a current mirror circuit formed of PMOSs 1502, 1519 and 1520. In accordance with this current mirror circuit, a current $I_8$ flowing through NMOS 1518 in response to the signal $a_6$, an output current $I_c$ flowing through PMOS 1520 of the compensation circuit 15, and a charging circuit $I_5$ of the capacitor 1505 are made in proportion to each other.

Figure 16:
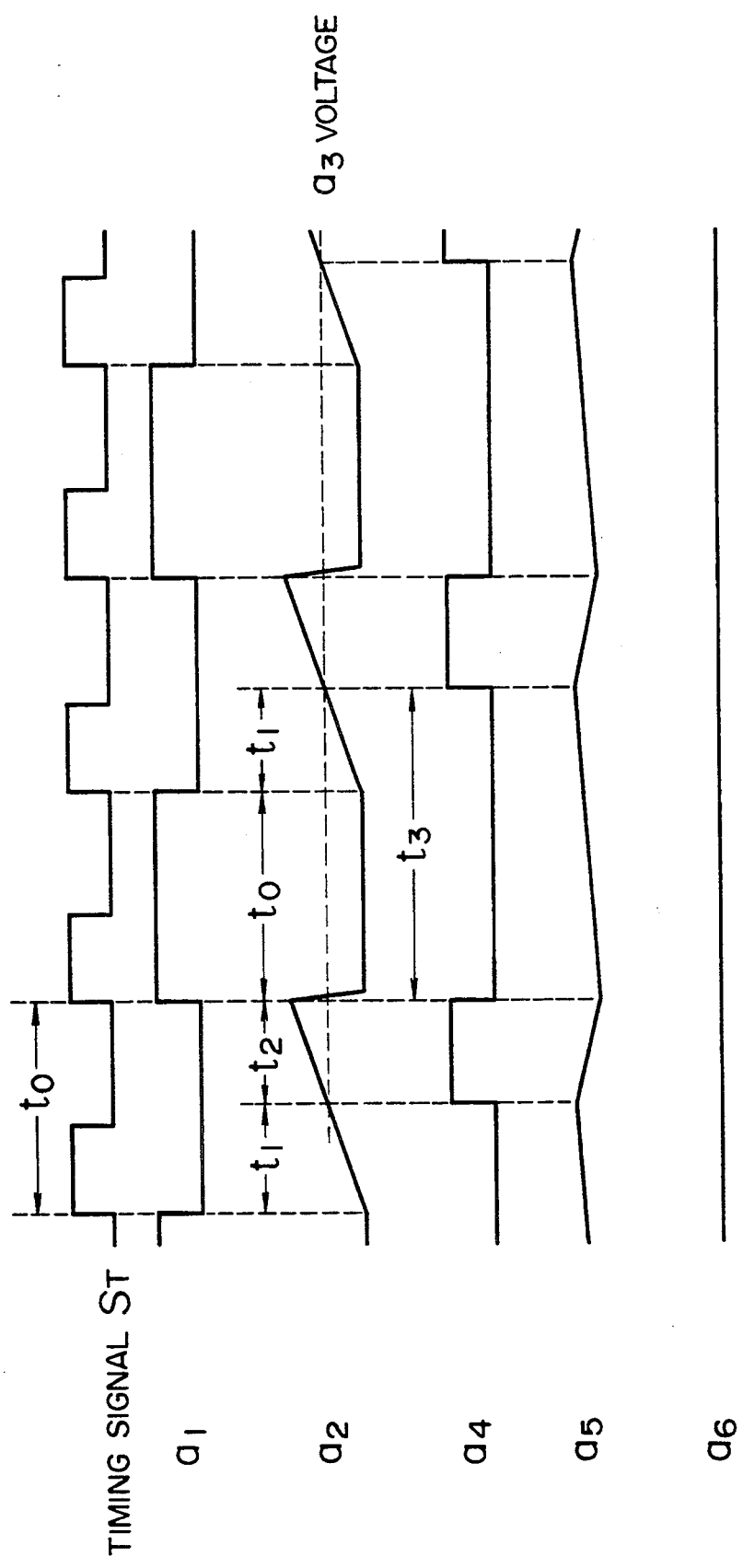
FIG. 16 is a timing chart for explaining an operation of the compensation circuit shown in FIG. 15.

In FIG. 16, there is shown a timing chart of potentials of various circuit portions of the compensation circuit 15. It should be noted that in this figure, the timing signals "$a_1$" and "$a_4$" represent logic levels. Assuming now that a current flowing through PMOS 1502 is "$I_5$"; currents flowing through current sources 1511 and 1514 are $I_6$ and $I_7$ respectively; a current flowing through PMOS 1519 and 1518 is "$I_8$"; capacitances of capacitors 1505 and 1515 are $C_1$ and $C_2$; and a frequency of a timing signal $S_T$ is $f_T$, a time period "$t_0$" thereof is expressed as follows:

$$t_0 = \frac{1}{f_T} \qquad (10)$$

It should be understood that as the signal $a_1$ corresponds to an output obtained by frequency-dividing the timing signal $S_T$ by 2 in the frequency divider 1501, this signal is a signal having a duty ratio of 50%, and is equal to "$t_0$" during periods of "H" and "L". On the other hand, the potential of the signal $a_2$ is increased at a gradient of $I_5/C_1$ since the capacitor 1505 is charged via PMOS 1503 and PMOS 1502 when the signal $a_1$ is at an "L" level. Conversely, when the signal $a_1$ is at a "H" level, NMOS 1504 quickly discharges the capacitor 1505 to a ground level. The signal $a_4$ becomes "L" when the signal $a_2$ is higher than the signal $a_3$ since the comparator 1510 compares the potential of $a_2$ with that of $a_3$, whereas the signal $a_4$ becomes "H" when the signal $a_2$ is lower than the signal $a_3$. It should be noted that, due to $3V_{BE}$ of the signal $a_3$, the signal $a_4$ takes "H" level during a period continuing from when the signal $a_1$ becomes "L" level and the signal $a_2$ is increased at a gradient of $I_5/C_1$ up to the potential of $3V_{BE}$ to when the signal $a_1$ becomes "H" level and the discharge of the capacitor 1505 is commenced. Assuming now a time "$t_1$" required from when the signal $a_1$ becomes "L" level and until the potential $a_2$ is increased up to the potential of $3 \cdot V_{BE}$ the signal $a_4$ takes a "H" level during a time $t_2$ expressed by the following equation:

$$t_2 = t_0 - t_1 \qquad (11)$$

On the other hand, since the potential of the signal $a_2$ is increased at a gradient of $I_5/C_1$, the time "$t_1$" is expressed by the following equation:

$$t_1 = \frac{3 \cdot V_{BE} \cdot C_1}{I_5} \qquad (12)$$

Also, if a time where the signal $a_4$ becomes "L" level is equal to "$t_3$", the following equation is satisfied:

$$t_3 = t_0 + t_1 \qquad (13)$$

Based upon the above-mentioned equations (10) to (13), the times "$t_2$" and "$t_3$" expressed as follows:

$$t_2 = \frac{1}{f_T} - \frac{3 \cdot V_{BE} \cdot C_1}{I_5} \qquad (14)$$

$$t_3 = \frac{1}{f_T} + \frac{3 \cdot V_{BE} \cdot C_1}{I_5} \qquad (15)$$

In other words, when the current $I_5$ becomes large, the time $t_2$ become large and the time $t_3$ becomes small. Conversely, if the current $I_5$ becomes small, the time $t_2$ becomes small and the time $t_3$ becomes large.

The potential of the signal $a_5$ is determined by the signal $a_4$ for controlling the charge pump circuit including PMOS 1512 and NMOS 1513. That is to say, when the signal $a_4$ becomes "L" level, since the capacitor $C_2$ 1515 is charged via PMOS 1512 by the current source 1511, the potential is increased at a gradient of $I_6/C_2$. On the other hand, when the signal $a_4$ becomes "H" level, the capacitor $C_2$ 1515 is discharged via NMOS 1513 by the current source 1514 so that the potential is decreased at a gradient of $I_7/C_2$.

The potential of the signal $a_6$ corresponds to a potential obtained by smoothing the potential of the signal $a_5$ by the low-pass filter circuit formed of the resistor 1516 and a capacitor 1517. As a result, during the charge/discharge operations of the capacitor $C_2$ 1515, when the charged charges are greater than the charges to be discharged, the potential of the signal $a_6$ is increased. Conversely, when the charged charges are smaller than those to be discharged, the potential of the signal $a_6$ is decreased.

It should be noted that the quantities of charges "$Q_P$" and "$Q_D$" charged/discharged respectively during a charging/discharging cycle of the capacitor $C_2$ 1515 are expressed by the following equations:

$$Q_P = t_3 \cdot I_6$$

$$Q_D = t_2 \cdot I_7 \qquad (16)$$

Based upon the above equations 14 through 16, both the charges $Q_P$ and $Q_D$ are expressed by the following equation:

$$Q_P = \left( \frac{1}{f_T} + \frac{3 \cdot V_{BE} \cdot C_1}{I_5} \right) I_6 \qquad (17)$$

$$Q_D = \left( \frac{1}{f_T} - \frac{3 \cdot V_{BE} \cdot C_1}{I_5} \right) I_7$$

That is to say, when $I_5$ becomes large, $Q_P$ becomes small and $Q_D$ becomes large, so that the potential of $a_6$ is reduced. Conversely, when $I_5$ becomes small, $Q_P$ becomes large and $Q_D$ becomes small, with the result that the potential of $a_6$ is increased.

On the other hand, since the potential of $a_6$ corresponds to a bias voltage of NMOS 1518, $I_8$ is increased if the potential of $a_6$ is increased, whereas $I_8$ is reduced if the potential of $a_6$ is decreased. Since both PMOSs 1519 and 1502 constitute a current mirror, there is a proportional relationship between the currents $I_8$, $I_C$ and $I_5$, which will be expressed as follows:

$$I_C = n_5 \cdot I_8 \qquad (18)$$

$$I_5 = n_6 \cdot I_8 \qquad (19)$$

As a consequence, if the potential of $a_6$ is increased, the current $I_5$ is increased, whereas if the potential of $a_6$ is decreased, the current $I_5$ is reduced. In other words, the present embodiment constitutes a negative feedback loop, the current $I_8$ is large and the current $I_5$ is also large when the potential of $a_6$ is high. If the current $I_5$ is large, since the potential increase of the signal $a_2$ becomes rapid, the time $t_2$ becomes large. When the time $t_2$ is large, the discharged charges become great so that the potential of the signal $a_6$ is lowered. Conversely, in case that the potential of the signal $a_6$ is low, the feedback loop operates so that the potential of the signal $a_6$ is increased. Thus, this negative feedback loop is balanced when the charged/discharged charges "$Q_P$" and "$Q_D$" to $a_5$ are equal to each other. Now if it is assumed $Q_P = Q_D$ in the above equation (17), the following equation can be satisfied:

$$I_5 = 3 \cdot V_{BE} \cdot C_1 \cdot \frac{I_7 + I_6}{I_7 - I_6} \cdot f_T \qquad (20)$$

Based on the above-mentioned equations (18) to (20), the output current of the compensation circuit 15 is as follows:

$$I_C = 3 \cdot V_{BE} \cdot C_1 \cdot \frac{n_5}{n_6} \cdot \frac{I_7 + I_6}{I_7 - I_6} \cdot f_T \qquad (21)$$

As previously stated, the compensation circuit 15 is so arranged that there is employed a negative feedback system for flowing an integration current which is proportional to the frequency $f_T$ of the input timing signal $S_T$, and there is provided a means for outputting an output current proportional to the integration current. As a consequence, this compensation circuit 15 constitutes a frequency/current converting circuit for outputting the output current $I_C$ proportional to the frequency $f_T$ of the timing signal $S_T$.

Now, a description will be made to a combination operation between the voltage controlled oscillator 13 shown in FIGS. 10 to 13, and the compensation circuit 15 shown in FIG. 15. Between the output current $I_C$ of the compensation circuit 15 and the frequency range of the oscillating frequency $f_O$ of the voltage controlled oscillator VCO 13, there exists a relationship defined by the foregoing equation (9). Since, on the other hand, there is another relationship defined by the above-explained equation (21) between the frequency $f_T$ of the timing signal $S_T$ and the output currents $I_C$, the following equation can be satisfied between the frequencies $f_o$ and $f_T$:

$$\frac{3}{4} \cdot \frac{n_3 \cdot n_4 \cdot n_5}{n_6} \cdot \frac{I_7 + I_6}{I_7 - I_6} \cdot (n_2 + n_1) \cdot \frac{C_1}{C_0} \cdot f_T \geq f_o \geq \qquad (22)$$

$$\frac{3}{4} \cdot \frac{n_3 \cdot n_4 \cdot n_5}{n_6} \cdot \frac{I_7 + I_6}{I_7 - I_6} \cdot (n_2 - n_1) \cdot \frac{C_1}{C_0} \cdot f_T$$

That is to say, the range of the oscillating frequency of VCO 13 can be determined by the frequency $f_T$ of the timing signal $S_T$ via the compensation circuit 15. When the frequency $f_T$ of the timing signal becomes high, the frequency range of VCO 13 is also increased. Conversely, when the frequency $f_T$ thereof becomes low, then the frequency range is also lowered. In the clock generating circuit 20 shown in FIG. 1, a control is performed in such a manner that the frequency $f_T$ of the timing signal becomes equal to the frequency $f_C$ of the synchronization clock signal. Since the frequency $f_C$ is equal to the frequency which is obtained by frequency-dividing the oscillating frequency $f_O$ of VCO 13 by the frequency divider 14, the frequency range of the oscillating frequency of VCO 13 must contain a frequency obtained by multiplifying the frequency $f_T$ of the timing frequency by the frequency dividing number (divisor) of the divider 14. Then, assuming now that the frequency dividing number of the divider 14 is N and the respective circuit constants are selected to satisfy the following equation (23):

$$N = \frac{3}{4} \cdot \frac{n_3 \cdot n_4 \cdot n_5}{n_6} \cdot \frac{I_7 + I_6}{I_7 - I_6} \cdot n_2 \cdot \frac{C_1}{C_0} \qquad (23)$$

the above equation (22) is converted to the following equation into (20).

$$N \cdot f_T + \frac{n_1}{n_2} \cdot N \cdot f_T \geq f_o \geq N \cdot f_T - \frac{n_1}{n_2} N \cdot f_t \qquad (24)$$

As a consequence, since the frequency range of the oscillating frequency $f_O$ necessarily contains a frequency $N \cdot f_T$ which is produced by multiplying the frequency $f_T$ of the timing signal by the frequency dividing number N, the non-operating condition does not occur and the clock generating circuit having the wide frequency range can be realized. The clock generating circuit can respond to the variations in the frequency $f_T$ of the timing signal.

In the above embodiment, if both the timing capacitor $C_O$ of VCO 13 and the capacitor $C_1$ of the integration circuit in the compensation circuit 15 are formed in the same structure, the capacitance fluctuations occurring while the semiconductor integrated circuit is manufactured can be equalized. As a result, the value of "N" defined in equation 23 and determined by the ratio of the capacitors $C_0$ and $C_1$ can be maintained constant irrelevant to the fluctuations in the capacitors, and therefore "N" can be set to an exact value.

In FIG. 17, there is represented a structure of a capacitor 1204, according to one embodiment, for determining the oscillating frequency $f_O$ of the current controlled oscillator 1002 shown in FIG. 12. A capacitor 1701 has the same structure as that of a capacitor 1702, and has the same capacitance value as that of the capacitor 1702. These capacitors 1701 and 1702 are connected in parallel with their terminals "$b_0$" and "$b_1$" inversely connected to each other. That is to say, in the situation where a capacitor is fabricated on an LSI chip, a stray capacitance is present other than the capacitance between two terminals of the capacitor. Since such a stray capacitance has a different value with respect to each of the terminals $b_0$ and $b_1$, a terminal dependency occurs in the situation where a capacitor is connected in such a chip. Considering now the current controlled oscillator 1002, it is stray capacitances are different from each other between two terminals of the capacitor 1204, the currents flowing through the stray capacitors are different from each other even when the same currents are drawn by NMOSs 1202 and 1203, so that the operating currents in the circuit are different. As a result, the switching periods of the transistors 1205 and 1206 are varied and thus the oscillating output having a duty ratio of 50% cannot be obtained. Therefore, as described above, since two capacitors having the same structure and same capacitance with each other are connected in an inverse-parallel connection, the overall stray capacitance with its respective terminal is equal even if the respective stray capacitances between the two terminals of each capacitor are different, and thus there is a particular advantage that no terminal dependency exists. In the emitter coupled type multivibrator employing it as the timing capacitor, there is such a merit that the oscillating output having a duty ratio of 50% can be produced.

FIG. 18 represents a concrete structure where the capacitor 1701 or 1702 shown in FIG. 17 is formed on an LSI chip. FIG. 18A is a plan view of the LSI chip, and FIG. 18B is a sectional view taken along a line B—B in FIG. 18A. As shown in these Figures, a first poly-Si layer 1803 is formed via an insulating film 1802 on a substrate 1801, a second poly-Si layer 1804 is formed thereabove, and further a first Al layer 1805 is formed thereabove in a multi-layered structure. Then, the first poly-Si layer is connected to the first Al layer via a contact hole 1806. A capacitance between terminals "$b_0$" and "$b_1$" corresponds to a parallel capacitance defined by a capacitance $C_{11}$ between the first poly-Si layer 1803 and second poly-Si layer 1804 and by another capacitance $C_{12}$ between the second only-Si layer 1804 and first Al layer 1805. It should be noted that a stray capacitance $C_{13}$ at the terminals is formed only between the first layer polysilicon film 1804 and the substrate 1801.

That is to say, since the above embodiment shown in FIG. 18 is so constructed that the capacitance is formed by overlapping the first to third conductor films with each other in a layered structure, there is a particular advantage that the capacitance can be increased without increasing the chip area or the stray capacitance.

We claim:

1. A clock generator comprising
   phase comparing means for outputting a signal in response to a phase difference between two input signals;
   voltage controlled oscillating means for generating a signal of a frequency within a range of oscillating frequencies in response to the output signal of said phase comparing means;
   means for generating a clock signal in response to an oscillating output of said voltage controlled oscillating means, an externally supplied input timing signal and said generated clock signal being inputted as said two input signals to said phase comparing means to thereby control said oscillating means to cause said clock signal to be synchronized with said input timing signal; and
   compensating means responsive to said input timing signal for controlling said voltage controlled oscillating means to vary range of oscillating frequencies of said voltage controlled oscillating means in response to a frequency change in said input timing signal.

2. A clock generator comprising:
   phase comparing means for outputting a signal in response to a phase difference between two input signals;
   voltage controlled oscillating means responsive to the output signal of said phase comparing means for producing an output signal having a frequency, within a range of oscillating frequencies, corresponding to the output signal of said phase comparing means;
   means for generating a first clock signal based upon said output signal of said voltage controlled oscillating means;
   distributing means for converting said first clock signal into a plurality of second clock signals and for distributing said second clock signals;
   compensating means responsive to an input timing signal for controlling said voltage controlled oscillating means to vary said range of oscillating frequencies of said voltage controlled oscillating means in response to a change in frequency of said input timing signal; and
   means for inputting one of said second clock signals and said timing signal to said phase comparing means as said two phase-compared input signals.

3. A clock generator as claimed in claim 1, wherein said compensating means includes an integrator circuit adapted to be set/reset by said timing signal, and frequency/current converting means for outputting a current proportional to an integration current flowing through said integrator circuit as an output signal; said voltage controlled oscillating means comprises voltage/current converting means and current controlled oscillating means; said voltage/current converting means includes means for outputting a current signal which is varied in response to an input signal and means for varying a central level of a changing band width of said output current signal in response to the output signal from said compensating means; and said current controlled oscillating means includes means for oscillating a signal having a frequency corresponding to the output current signal from said voltage/current converting means.

4. A clock generator as claimed in claim 2, wherein said compensating means includes an integrator circuit adapted to be set/reset by said timing signal, and frequency/current converting means for outputting a current proportional to an integration current flowing through said integrator circuit as an output signal; said voltage controlled oscillating means comprises voltage/current converting means and current controlled oscillating means; said voltage/current converting means includes means for outputting a current signal which is varied in response to an input signal and means for varying a central level of a changing band width of said output current signal in response to the output signal from said compensating means; and said current controlled oscillating means includes means for oscillating a signal having a frequency corresponding to the output current signal from said voltage/current converting means.

5. A clock generator as claimed in claim 3, wherein said current controlled oscillating means includes a multivibrator, the oscillating frequency of which is determined by a charging/discharging time period of a capacitance, and means for controlling a charging/discharging current of said capacitance in response to the output current signal of said voltage/current converting means.

6. A clock generator as claimed in claim 5, wherein said multivibrator includes two switching circuits in each of which a load element comprising a MOS transistor is connected to a collector of a switching bipolar transistor; the input add output terminals of each of said switching circuits being cross-connected via a level shift circuit to each other such that the output terminal of one switching circuit is connected with an input terminal of the other switching circuit of said two switching circuits, and an input terminal of the one switching circuit is connected with the output terminal of said other switching circuit; and said multivibrator is an emitter coupled type multivibrator arranged by coupling an emitter of said each switching bipolar transistor by a capacitor.

7. A clock generator as claimed in claim 6, wherein said switching circuit of said multivibrator includes means for setting an impedance of said load element to a large value when said switching transistor is turned on, and also for setting said impedance to a small value when said switching transistor is turned off.

8. A clock generator as claimed in claim 4, wherein said multivibrator is fabricated on a semiconductor substrate, and a capacitor component for constructing said multivibrator comprises two capacitors formed on said semiconductor substrate, each having the same structure and the same capacitance, with their corresponding terminals inversely-coupled with each other.

9. A clock generator claimed in claim 8, wherein said two capacitors are fabricated by first, second and third conductors layered via a dielectric, and said first and third conductors are connected in parallel to each other.

10. A clock generator as claimed in claim 5, wherein said voltage controlled oscillating means and said compensating means are integrated in the same semiconductor device, and the capacitor for constituting said multivibrator and a capacitor for constituting an integration circuit of said compensating means are formed in the same structure.

11. A clock generator as claimed in claim 3, wherein said frequency/current converting means includes:
an integration circuit being set/reset by said timing signal;
a comparator for comparing an output voltage of said integration circuit with a predetermined reference voltage;
a charge pump circuit being driven in response to an output signal from said comparator;
a capacitor being charged/discharged by said charge pump circuit;
a low-pass filter for smoothing a voltage across said capacitor and for outputting the smoothed voltage;
a voltage/current converting circuit for converting an output voltage of said low-pass filter into a current signal;
an integration current control circuit for controlling an integration current of said integration circuit in response to a level of said current signal; and,
an output circuit for outputting a current signal in response to said level of said converted current signal.

12. An information processing system in which a plurality of information processing sections are connected via a bus to each other, each of said information processing sections including means for generating a clock signal in synchronization with an input timing signal commonly supplied thereto, and means for effecting a synchronous data processing including a data transfer between one and another of said information processing sections based on said clock signal, wherein said clock signal generating means provided within each of said information sections comprises:
phase comparing means for outputting a signal in response to a phase difference between two input signals;
voltage controlled oscillating means for producing a signal having a frequency, within a range of oscillating frequencies, corresponding to an output signal from said phase comparing means;
means for generating a clock signal based upon an oscillating output of said oscillating means, both the input timing signal and the generated clock signal being inputted as said two input signals to said phase comparing means so as to generate a clock signal from said clock signal generating means in synchronization with said timing signal; and
compensating means responsive to said timing signal for controlling said voltage controlled oscillating means to vary said range of oscillating frequencies of said voltage controlled oscillating means in response to a frequency variation of said input timing signal.

13. An information processing system in which a plurality of information processing sections are connected via a bus to each other, each of said information processing sections including means for generating a clock signal in synchronization with an input timing signal commonly supplied thereto, and means for effecting a synchronous data processing including a data transfer between one and another of said information processing sections based on said clock signal, wherein clock signal generating means provided within each of said information processing sections comprises:
phase comparing means for outputting a signal in response to a phase difference between two input signals;
voltage controlled oscillating means for producing a signal having a frequency within a range of oscillating frequencies in response to the output signal of said phase comparing means;
distributing means for producing and distributing a plurality of clock signals in response to the output signal from said oscillating means;
compensating means for controlling said voltage controlled oscillator means to vary said range of oscillating frequencies of said voltage controlled oscillating means in response to a frequency variation of said input timing signal; and
means for inputting as said two input signals of said phase comparing means, said timing signal and one of said plurality of clock signals outputted from said distributing means.

14. A clock generator as claimed in claim 11, wherein said charge pump circuit comprises:
a current injecting MOS transistor connected to an output terminal via a first transistor switch;
a current drawing MOS transistor connected to said output terminal via a second transistor switch;
control means for controlling said two transistor switches in such a manner that when one of said two transistor switches is turned off, the other transistor switch is turned on;
a third transistor switch connected to said current injecting MOS transistor so as to provide a drain current of said current injecting MOS transistor when said first switch is turned off; and
a fourth transistor switch connected to said current drawing MOS transistor in order to provide a drain current of said current drawing MOS transistor when said second transistor switch is turned off.

* * * * *